US012717687B2

(12) United States Patent
Chandavarkar et al.

(10) Patent No.: US 12,717,687 B2
(45) Date of Patent: Aug. 25, 2026

(54) AUTOMATING THE CONFIGURATION AND TUNING OF A DISASTER RECOVERY PREPARATION SYSTEM

(71) Applicant: NUTANIX, INC., San Jose, CA (US)

(72) Inventors: Rohan Chandavarkar, San Jose, CA (US); Kushagra Mishra, Cary, NC (US); Manan Hemantkumar Shah, Newark, CA (US); Kai Tan, Cary, NC (US); Ramya Uthamarajan, Cary, NC (US); Karthikeyan Vaideswaran, Morrisville, NC (US)

(73) Assignee: NUTANIX, INC., San Jose, CA (US)

( * ) Notice: Subject to any disclaimer, the term of this patent is extended or adjusted under 35 U.S.C. 154(b) by 0 days.

(21) Appl. No.: 18/515,021

(22) Filed: Nov. 20, 2023

(65) Prior Publication Data

US 2025/0165365 A1 May 22, 2025

(51) Int. Cl.
*G06F 11/22* (2006.01)

(52) U.S. Cl.
CPC ................................ *G06F 11/2215* (2013.01)

(58) Field of Classification Search
CPC .................................................. G06F 11/2215
See application file for complete search history.

(56) References Cited

U.S. PATENT DOCUMENTS 8,549,518 B1 10/2013 Aron et al.
8,601,473 B1 12/2013 Aron et al.
8,850,130 B1 9/2014 Aron et al.
8,863,124 B1 10/2014 Aron
9,009,106 B1 4/2015 Aron et al.
9,069,708 B2 6/2015 Gill et al.
9,274,903 B1 3/2016 Garlapati et al.
(Continued)

FOREIGN PATENT DOCUMENTS

CN 113254279 A 11/2021

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Bryce P Bonzo
*Assistant Examiner* — Audrey Emma Whitesell
(74) *Attorney, Agent, or Firm* — Artegis Law Group, LLP

(57) ABSTRACT

In some embodiments, a method for tuning a disaster recovery preparation system for a storage system includes determining whether the disaster recovery preparation system has not met a recovery point objective; and in response to determining that the recovery point objective is not met: determining a state of the storage system; applying a machine learning model to determine a change to one or more of a plurality of adjustable parameters of the disaster recovery preparation system based on the state of the storage system and the recovery point objective that is not met; adjusting the one or more of the plurality of adjustable parameters based on the determined change to the one or more parameters; after adjusting the one or more parameters, monitoring one or more metrics of the disaster recovery preparation system or the storage system; and updating the machine learning model based on the monitoring.

36 Claims, 9 Drawing Sheets

(56) References Cited

U.S. PATENT DOCUMENTS

| | | | | |
|---|---|---|---|---|
| 9,336,132 | B1 | 5/2016 | Aron et al. | |
| 9,448,900 | B2 | 9/2016 | Gordon et al. | |
| 9,495,370 | B1 | 11/2016 | Chatterjee et al. | |
| 9,652,265 | B1 | 5/2017 | Narayanasamy et al. | |
| 9,747,287 | B1 | 8/2017 | Bhardwaj et al. | |
| 9,772,866 | B1 | 9/2017 | Aron et al. | |
| 10,747,606 | B1 * | 8/2020 | Shemer | G06F 11/079 |
| 10,754,729 | B2 | 8/2020 | Mehta et al. | |
| 11,461,200 | B2 | 10/2022 | Reyes et al. | |
| 2003/0093444 | A1 * | 5/2003 | Huxoll | G06F 11/1471 |
| 2009/0307166 | A1 | 12/2009 | Routray et al. | |
| 2020/0192767 | A1 | 6/2020 | Savino et al. | |
| 2021/0034448 | A1 | 2/2021 | Raghunathan et al. | |
| 2022/0156162 | A1 * | 5/2022 | Reyes | G06F 11/3006 |
| 2023/0083724 | A1 * | 3/2023 | Cella | G06Q 20/389 705/28 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/ ; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

Cano, Ignacio et al. "Curator: Self-Managing Storage for Enterprise Clusters"; University of Washington; published Mar. 2017; pp. all.

Poitras, Steven. "The Nutanix Bible" (Mar. 2, 2020), from https://nutanixbible.com/; pp. all.

Poitras, Steven. "The Nutanix Bible" (Sep. 1, 2020), from https://nutanixbible.com/; pp. all.

Ctirix Validated Solutions, "Citrix XenDesktop 7.1 on Microsoft Hyper-V Server 2012 R2 on Nutanix Virtual Computing Platform Solution Design", Prepared by: Citrix Validated Solutions, Jun. 25, 2014.

Poitras, Steven et al., The Nutanix Bible—Classic Edition, Nov. 29, 2023, 276 pages, https://www.nutanixbible.com/pdf/classic.pdf.

Disaster Recover Services | India, Dec. 18, 2023, 13 pages, https://services.global.ntt/de-de/services-und-produkte/multicloud-as-a-service-india/disaster-recovery-and-data-resiliency/disaster-recovery.

* cited by examiner

AUTOMATING THE CONFIGURATION AND TUNING OF A DISASTER RECOVERY PREPARATION SYSTEM

BACKGROUND

Field of the Various Embodiments

The various embodiments relate generally to computing devices and, more specifically, to tuning a disaster recovery preparation system using reinforcement learning.

DESCRIPTION OF THE RELATED ART

Recovery Point Objectives (RPOs) play a pivotal role in ensuring the resilience of storage systems. In a disaster recovery system, an RPO refers to the maximum acceptable amount of data loss that an organization is willing to tolerate in the event of a system failure or a disaster. It represents the point in time to which data can be restored after a disruption occurs. Meeting the RPO ensures that data recovery operations can restore systems and applications to a state that aligns with the organization's acceptable level of data loss. Achieving and maintaining an optimal RPO is crucial for ensuring data resilience and minimizing potential disruptions in critical business operations.

In order to support the recovery of data in a storage system when a storage device or node in a cluster hosting the storage system fails, the storage system uses a disaster recovery preparation system to perform regular snapshots of the data and then replicates or copies the snapshots to another node. The snapshot and replication operations are typically subject to a RPO that guarantees the completion of all the snapshots and replications within a defined period of time, such as one hour or six hours, before repeating the process.

However, when the RPO is not met, an alert is triggered, signifying a potential vulnerability in the system's disaster recovery capabilities. In such cases, it becomes necessary to engage a skilled engineer who can fine-tune the parameters of the storage system. These parameters dictate the behavior and performance of the storage system, influencing its ability to meet the RPO. Tuning these parameters is a task that demands a deep understanding of the storage system's intricacies and the nuanced interactions between the various components of the storage system. As a consequence, engineers face a steep learning curve, necessitating a significant investment of time to master this process. Moreover, achieving the desired RPO can be an iterative process, potentially spanning days or even weeks, as engineers navigate the delicate balance of system settings. Furthermore, sharing this specialized knowledge across engineering teams proves to be a challenge. Each storage system may present unique characteristics and requirements, necessitating tailored tuning strategies. This diversity in configurations amplifies the complexity of achieving optimal RPOs across different environments.

As the foregoing indicates, what is needed are more effective techniques for streamlining the parameter tuning process and expediting the achievement of optimal RPOs.

SUMMARY

One embodiment sets forth one or more non-transitory computer-readable media storing program instructions that, when executed by one or more processors, cause the one or more processors to perform a method for tuning a disaster recovery preparation system for a storage system. The method includes determining whether the disaster recovery preparation system has not met a recovery point objective; and in response to determining that the recovery point objective is not met, the method includes: determining a state of the storage system; applying a machine learning model to determine a change to one or more of a plurality of adjustable parameters of the disaster recovery preparation system based on the state of the storage system and the recovery point objective that is not met; adjusting the one or more of the plurality of adjustable parameters based on the determined change to the one or more parameters; after adjusting the one or more parameters, monitoring one or more metrics of the disaster recovery preparation system or the storage system; and updating the machine learning model based on the monitoring, wherein the plurality of adjustable parameters comprise at least two of: a time window when disaster recovery preparation operations are performed; a bandwidth allocated to the disaster recovery preparation system; a priority assigned to the disaster recovery preparation system; or a number of snapshots that can be concurrently performed and replicated by the disaster recovery preparation system.

Other embodiments include, without limitation, methods for performing one or more aspects of the disclosed techniques and systems that implement one or more aspects of the disclosed techniques.

At least one technical advantage of the disclosed techniques relative to the prior art is that, with the disclosed techniques, parameters for a storage system can be tuned rapidly and efficiently by using an automated tuner that monitors the storage system's performance, ensuring that RPOs are consistently met. This automation eliminates the need for manual intervention, saving valuable time and resources. In addition, the automated tuner uses a reinforcement learning model, comprising one or more machine learning agents, which allows the automated tuner to swiftly adapt to different storage system environments and workloads is a notable advantage. By training on data from diverse storage systems and potentially fine-tuning for specific scenarios, the disclosed techniques offer a versatile and efficient solution for optimizing performance. Ultimately, the integration of the automated tuner streamlines disaster recovery processes, enhancing data resilience and reducing the time and effort typically associated with manual parameter tuning. The disclosed techniques, therefore, provide various improvements in the manner in which organizations safeguard their critical data assets, representing a significant advancement in automated disaster recovery preparation systems. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
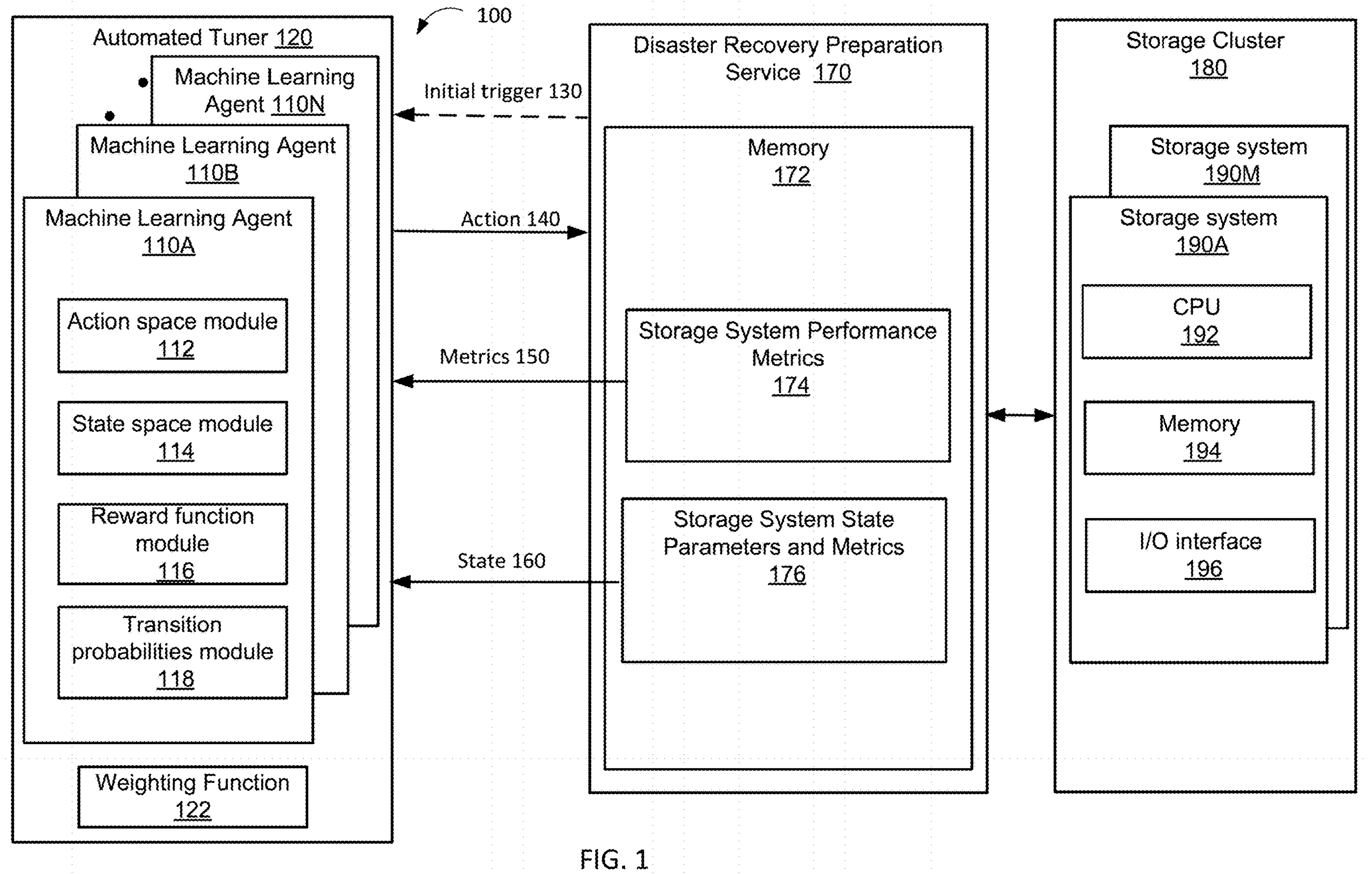
FIG. 1 is a block diagram illustrating a system for dynamically tuning the parameters associated with a storage system using reinforcement learning techniques, according to various embodiments.

In the following description, numerous specific details are set forth to provide a more thorough understanding of the various embodiments. However, it will be apparent to one skilled in the art that the inventive concepts may be practiced without one or more of these specific details.

Disaster Recovery Services Overview

Disaster recovery services constitute a critical component of modern information technology infrastructure, providing a safeguard against unforeseen disruptions that could otherwise cripple organizational operations. These services encapsulate a comprehensive array of strategies, technologies, and protocols designed to ensure the swift restoration of essential functions and data repositories in the wake of a catastrophic event. A disaster recovery service is a dynamic amalgamation of methodologies, ranging from sophisticated backup routines to real-time data replication mechanisms and automated failover procedures. These elements collectively fortify an organization's capacity to recover swiftly from adversity, ensuring minimal disruption and data loss. Effectively integrating these services demands an orchestration of various technical components, including but not limited to data synchronization engines, failover automation scripts, and redundant storage architectures.

A Recovery Point Objective (RPO) is a metric used in connection with disaster recovery services that quantifies the allowable degree of data loss an organization can tolerate in the event of a disaster. The RPO serves as the keystone in disaster recovery planning, guiding the establishment of protocols that govern data preservation, continuity of operations, and resource allocation. Critical to the effectiveness of any disaster recovery strategy is the calibration of operational parameters associated with the storage system to align with the defined RPO. This calibration necessitates a deeper understanding of data transaction patterns of the storage system, overall storage system behavior, and the complex interplay between replication processes, backup schedules, and recovery mechanisms. Furthermore, calibrating the operational parameters requires careful decision-making in the selection of recovery points, optimizing resource utilization while upholding data fidelity. As noted previously, whenever an RPO is not met, an alert is generated. In response to an alert or a reconfiguration of the storage system, an engineer is typically brought in to tune the various operational parameters of a disaster recovery preparation service associated with the storage system so that the RPO can be met for future snapshot and replication operations.

A disaster recovery preparation service and the associated one or more storage systems are interrelated components within the IT infrastructure of an organization. The storage system is responsible for storing and managing data. The storage system ensures that data is reliably saved and accessible. The disaster recovery preparation service, on the other hand, involves creating strategies and processes to safeguard data and systems against catastrophic events. This often includes creating backups of critical data and systems, which are stored in the storage system. The disaster recovery preparation service sets objectives for how quickly data and systems need to be recovered after a disaster (tracked using a Recovery Time Objective (RTO) metric) and how much data loss is acceptable (tracked using the RPO metric). The storage system accomplishes these objectives by providing the necessary infrastructure to maintain backup copies and facilitate recovery. Further, the disaster recovery preparation service often involves testing and simulating disaster scenarios to ensure preparedness. The storage system provides a controlled environment for conducting these tests, allowing organizations to validate their recovery strategies.

In order to support the recovery of data in a storage system when a storage device or node in a cluster hosting the storage system fails, the storage system uses the disaster recovery preparation service to perform regular snapshots and then replicates the snapshots on another node. The snapshot and replication operations are typically subject to the RPO, which guarantees the completion of all the snapshots and replications within a defined period of time (e.g., one hour to six hours) before repeating the process. As mentioned previously, because the storage system and the interactions between the parameters used to tune the disaster preparation recovery service are complex, it often takes a long time for an engineer to learn how to set the operational parameters for a typical storage system that allows the disaster recovery prevention system to meet the RPO.

System Overview

The disclosed techniques use an automated tuner to continually monitor the storage system and to automate the configuration and tuning of a disaster recovery preparation service responsible for creating backups of data stored on the storage system. When an RPO is not met or the storage system is reconfigured, the automated tuner will automatically make adjustments to the parameters associated with the disaster recovery preparation service and continue to monitor the storage system to see whether additional adjustments to the parameters are needed.

FIG. 1 is a block diagram illustrating a system 100 for dynamically tuning the parameters associated with a storage system using reinforcement learning techniques, according to various embodiments. As shown in FIG. 1, the system 100 includes, without limitation, an automated tuner 120, a disaster recovery preparation service 170, and a storage cluster 180. The automated tuner 120 includes, without limitation, one or more machine learning agents 110 (e.g., machine learning agent 110A, 110B . . . 110N) and a weighting function module 122. Note that for explanatory purposes, multiple instances of like objects are denoted with reference numbers identifying the object and letters identifying the instance, where needed. Each machine learning agent 110 includes, without limitation, an action space module 112, a state space module 114, a reward function module 116, and a transition probabilities module 118. The disaster recovery preparation service 170 includes, without limitation, a memory 172. The memory 172 stores, without limitation, a storage system performance metrics module 174 for monitoring and storing performance metrics associated with one of more storage systems 190 that are part of the storage cluster 180, a metrics module 176 for monitoring and storing state parameters and metrics associated one of more storage systems 190 that are part of the storage cluster 180. The storage cluster 180 includes, without limitation, one or more storage systems 190 (e.g. storage systems 190A, 190B . . . 190M). In some embodiments, the storage cluster 180 can comprise a single storage system 190. Each storage system 190 in the storage cluster comprises a CPU 192, a memory 194 and an I/O interface 196.

Using the machine learning agents 110A-110N, the automated tuner 120 continually monitors the one or more storage system 190A-M and automates the configuration and tuning of the disaster recovery preparation service 170 responsible for creating backups of data stored on the storage cluster 180. In some embodiments, each machine learning agent is associated with a machine learning model which can be a reinforcement learning model. In some embodiments, as noted above, when an RPO is not met or the storage system is reconfigured, the automated tuner 120 will automatically make adjustments to the parameters for the disaster recovery preparation service 170 and continue to monitor the storage system to see whether additional adjustments to the parameters are needed. In some embodiments, the automated tuner 120 uses a reinforcement learning model that can include one or more of the machine learning agents 110.

Reinforcement Learning Overview

Reinforcement learning (RL) is a type of machine learning process in which a software agent maps different situations in an environment to different actions in order to maximize a cumulative reward or minimize a cumulative cost. Reinforcement learning typically involves defining a set of states, a set of actions that can be taken to influence the set of states, and a reward/cost function for determining the reward/cost of transitioning from a first state to a second state due to a given action. During training, a reinforcement learning agent explores and evaluates, for a given state, the different actions included in the set of actions to learn a mapping between the different states included in the set of states and the different actions included in the set of actions. Accordingly, when the set of actions is large, the computational cost of exploring and evaluating the set of actions can be prohibitively expensive.

Figure 2:
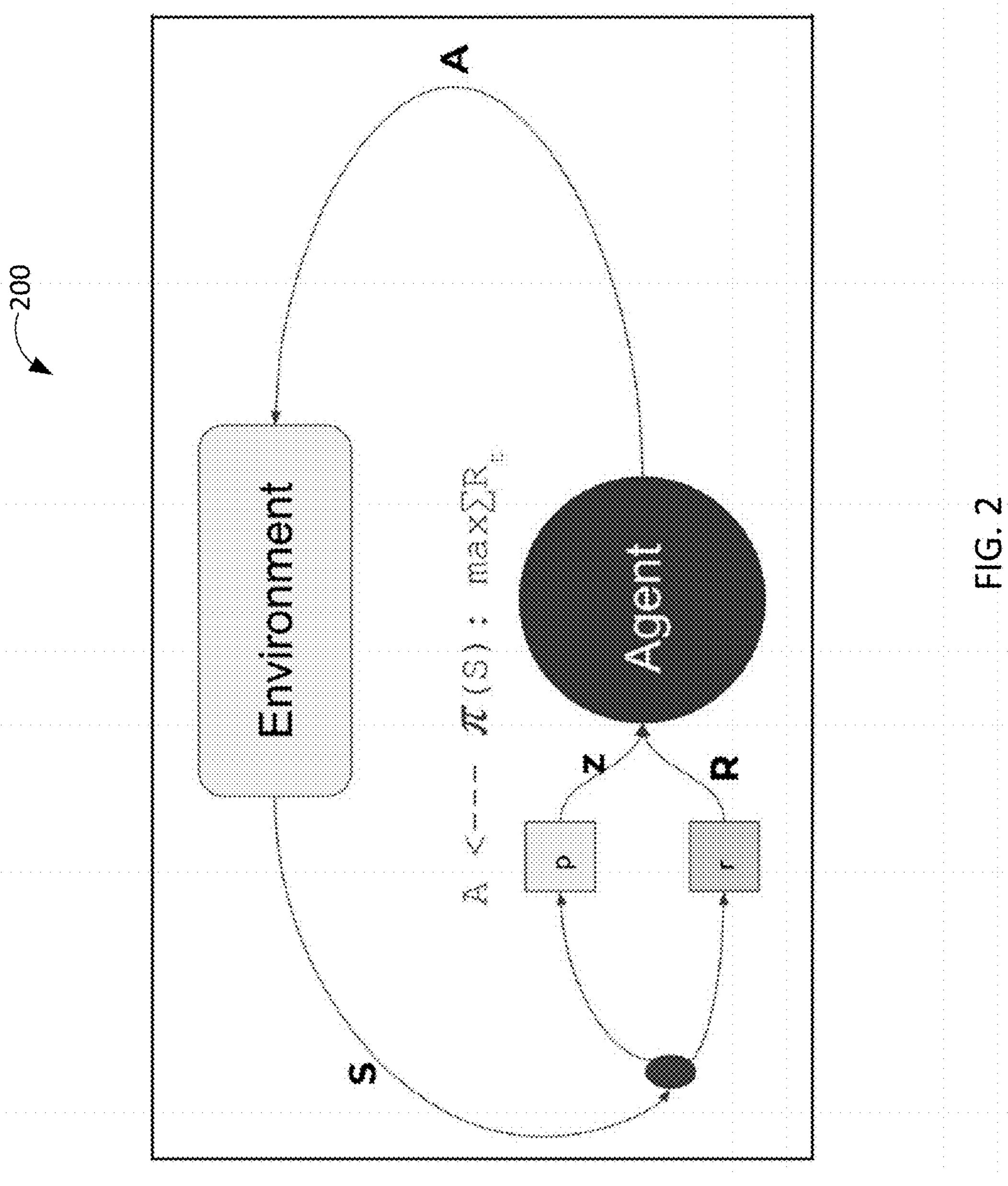
FIG. 2 is an illustration of various components of a reinforcement learning process, according to various embodiments.

FIG. 2 is an illustration of various components of a reinforcement learning process 200, according to various embodiments. As shown in FIG. 2, an RL problem is defined by a set of states S (the state space), a set of actions A (the action space) that are available to influence S, the transition probability $P_a(s,s')$ that an action a in state s will lead to state s', and the reward signal $R_a(s,s')$ received after transitioning from state s to state s' due to action a. Each state s included in the set of states S represents a state of the environment. Each action a included in the set of actions A represents an action that can be taken within the environment and cause a change in the current state of the environment. The reward function is defined based on one or more goals to be achieved. The transition probability or state-action mapping is defined by the environment dynamics. The cumulative reward or cumulative cost is computed by adding the reward or cost, respectively, caused by performing each successive action.

A reinforcement learning agent is trained to learn an optimal, or near-optimal policy, that maximizes the cumulative reward and/or minimizes the cumulative cost of actions taken over time. In some embodiments, the reinforcement learning agent is a Markov decision process. Any suitable reinforcement learning training algorithms can be used to train a reinforcement learning agent. Example reinforcement learning training algorithms include Monte Carlo, Q-learning, state-action-reward-state-action (SARSA), Q-learning lambda, SARSA lambda, deep Q network, deep deterministic policy gradient, asynchronous advantage actor-critic, Q-learning with normalized advantage functions, trust region policy optimization, proximal policy optimization, twin delayed deep deterministic policy gradient, soft actor-critic, and/or the like.

In some embodiments, a reinforcement learning process is used to train a Markov decision process to learn a policy that fulfills a target objective. In some embodiments, the policy causes the Markov decision process to choose actions within each state that maximize a reward provided by the reward function, where the reward function is based on the target objective. For example, the reward can be inversely proportional to a time taken by the Markov decision process to satisfy the target objective, and/or the like.

In some embodiments, the reinforcement learning training process uses a Q-learning approach, in which selecting an action within the current state pursues the target objective. In one example, the training process evaluates different actions that are predicted to maximize the reward function (or minimize the cost function) based on the current state ("exploitation") and some combinations of the weights that could produce further maximization of the reward function (or further minimization of the cost function) from the current state ("exploration").

Disaster Recovery Services Using Reinforcement Learning

As discussed above, because the storage system and the interactions between the parameters used to tune a disaster preparation recovery service are complex, it takes a long time for an engineer to learn how to set the operational parameters for a typical storage system. Referring back to FIG. 1, in some embodiments, accordingly, an automated tuner 120 that includes one or more machine learning agents 110 can be used to tune the parameters.

In some embodiments, when an RPO is not met by a disaster recovery preparation service 170 or one or more of the storage systems 190 is reconfigured, an initial trigger 130 is transmitted by the disaster recovery preparation service 170 to the automated tuner 120. The disaster recovery preparation service 170 further transmits a current state 160 of the storage system to the automated tuner 120.

In some embodiments, the current state 160 comprises various types of information associated with the disaster recovery preparation service 170 and/or the storage systems 190 that are part of the storage cluster 180. For example, the current state 160 can comprise the following parameters and metrics:

- Time of last backup: This parameter indicates the time of the most recent successful backup of the storage systems 190. This information helps identify how much data is likely at risk.
- Data Integrity Status: This parameter signifies whether the data in the storage systems 190 is intact or if there are any issues with data corruption or integrity.
- Replication Status: If replication is part of the disaster recovery strategy, this parameter informs about the status of data replication (e.g., for the snapshots created by the disaster recovery preparation service 170) between primary and secondary storage.
- Data Synchronization Status: This parameter indicates whether the data between primary and secondary storage associated with the storage systems 190 is synchronized or if there are any discrepancies.
- Volume and File System Information: Details about the storage volumes and file systems associated with the storage systems 190, such as their sizes, configurations, and available capacity.
- Application Availability: Information on the availability and status of critical applications hosted on the storage systems 190.
- Network Connectivity Status: This parameter covers the availability and condition of network connections between different components of the storage systems 190 and the disaster recovery preparation service 170.
- Hardware Health and Status: Reports on the condition of the physical hardware components (e.g., including disks, controllers, power supplies, etc.) associated with the storage systems 190.
- Error and Event Logs: Details about any errors, warnings, or events that occurred since the last backup, which can have implications for data recovery. The error statistics also provide information regarding whether one or more core services associated with the storage systems 190 is unstable. Moreover, the logs can reveal if any of the storage systems 190 were misconfigured. For instance, a customer tied to the storage system might inadvertently disable or misconfigure network compression, resulting in a significant network slowdown.
- Snapshot Status: If snapshots are being used by the disaster recovery preparation service 170, information about the status of snapshots including creation time, size, and number of available snapshots.
- Retention Policy Compliance: This parameter indicates whether the data retention policy is being followed correctly.
- Alerts and Notifications: Any alerts or notifications triggered due to deviations from the expected state of the system.
- Configuration Details: Information about the system configuration including settings, policies, and rules related to data protection and recovery (e.g., types of compression and deduplication methodology used).
- Recovery Procedures and Documentation: Documentation outlining the steps and procedures to follow for recovery in case of an RPO breach.
- Historical Statistics: This category provides data on the number of replications that have previously been executed. Combining this historical context with an assessment of the current state of the storage system 190 yields valuable insights. By examining past performance, it becomes possible to gauge the system's present status and identify any recent developments or potential issues. For instance, historical information can reveal whether replications or other operations associated with the storage systems 190 have been consistently up-to-date or if recent problems have arisen.

In some embodiments, the information associated with the current state 160 is retrieved, at least in part, from the storage system state parameters and metrics module 176, which monitors and stores state-related parameters and metrics associated with one of more storage systems 190 that are part of the storage cluster 180. In some embodiments, the current state 160 also includes information regarding performance metrics associated with the storage systems 190. In some embodiments, one or more of the performance metrics are retrieved, at least in part, from the storage system performance metrics module 174, which monitors and stores performance metrics associated with one or more storage system 190. The performance metrics can relate to I/O operations, latency, throughput, and other performance indicators that can help in assessing system health, as will be discussed further in detail below.

In some embodiments, the current state 160 is received by the state space module 114 included in each of the machine learning agents 110. In some embodiments, as will be further elaborated below, the state space module 114 supplies information about the current system state of the disaster recovery preparation service 170. The action space module 112 determines and analyzes a set of actions that are available to influence the state using the information received by the state space module 114. The action space module 112 then selects an action 140 to be performed. The action, for example, can be one or more tuning steps to be applied to the disaster recovery preparation service 170. In some embodiments, the action 140 to be performed can include tuning or modifying one or more of the following parameters:

- Changing a Bandwidth Allocated to the Disaster Recovery System: Increasing the bandwidth allocated to the disaster recovery preparation service 170 (e.g., for snapshot and replication operations) allows for faster data replication between primary and secondary sites. However, it can lead to higher costs and potential network congestion. Faster replication, for example, reduces the time it takes to achieve RPO, but can increase network utilization. For instance, the bandwidth allocated to the disaster recovery preparation service 170 can be augmented either by a specified percentage or a fixed range (e.g., a predetermined Mbps). On the other hand, the action space module 112 can decide not to increase the bandwidth, or opt to decrease it by a specific percentage or range.
- Modifying a Time of Replication: Adjusting the replication schedule affects when data is synchronized between primary and secondary systems. The time of replication can be set to real-time or at scheduled intervals. Real-time replication, for example, reduces data loss but can increase the load on both storage and network resources. For example, the time of replication (e.g., day of week, time of day, etc.) for a given storage system 190 can be adjusted by the automated tuner 120. Alternatively, the disaster recovery preparation service 170 can determine the time of replication based on an offset selected by the automated tuner 120. For example, the automated tuner 120 can select an action to perform replications either earlier than a scheduled time or later.

Staggering Batches at Different Times: Replicating data in batches at staggered times can help distribute the load on the network and storage resources. Replicating data in batches, for example, reduces the likelihood of network congestion and minimizes the strain on storage resources during replication. For example, if the network throughput is not high enough, the replications can be staggered so there are not too many concurrent replications being performed during a same time interval. For example, the automated tuner can specify actions regarding the manner in which to stagger the replication (e.g., staggering replications over a duration of time, or specifying a number of batches over which replications should be staggered, etc.) The automated tuner 120 can also elect not to stagger the replications and to perform them in a continuous block.

Priority of the Disaster Recovery System: Assigning priority levels to different types of data or applications determines which data gets replicated first by the disaster recovery preparation service 170. Higher priority ensures critical data is replicated promptly, potentially affecting the overall storage system load. Furthermore, different priorities can also be assigned to the various replication and snapshot operations to be performed by the disaster recovery preparation service 170, which also provides the ability to vary the overall storage system load as needed. For example, the automated tuner 120 can increase, decrease or keep the priority the same for a particular batch of data or replication operation.

Concurrent Snapshots: Setting the number of snapshots that can be taken simultaneously affects how much data is replicated concurrently. Higher concurrency, for example, allows for faster replication but can increase storage I/O operations and potentially strain storage resources. For example, the automated tuner 120 can increase, decrease or keep the number of snapshots taken at the same time.

Setting a Start Time of a Snapshot: Setting the start time of a snapshot influences when the replication process begins. Starting snapshots during off-peak hours can, for example, reduce contention for storage resources. For example, a start time for a snapshot (e.g., day of week, time of day, etc.) can be adjusted by the automated tuner 120. Alternatively, the disaster recovery preparation service 170 can determine the start time of a snapshot based on an offset selected or the automated tuner 120. For example, the automated tuner 120 can select an action to start the snapshot process either earlier than a scheduled time or later.

Local Memory and Processing Power Allocation for Replication: Allocating more memory and processing power for replication processes can improve the efficiency of data transfer and processing. Increases in memory and processing power allocation can, for example, lead to faster replication, but can also increase memory and processor usage on the storage system. For example, the automated tuner 120 can be configured to increase, decrease or keep the amount of memory allocated for replication processes the same.

Modifying Backup Frequency: Increasing the frequency of backups ensures that data is captured more frequently, reducing the potential data loss in case of a disaster. However, it increases memory usage on the storage system. For example, the automated tuner 120 can be configured to modify the backup frequency to increase, decrease or keep the same how often backups are performed.

Optimize Data Transfer: Enhancing the efficiency of data transfer processes, such as compression, deduplication, and WAN optimization, to reduce the time required to replicate data. For example, the automated tuner 120 can be configured to activate or deactivate a compression or deduplication process to modify the efficiency of the data transfer process during replication.

As discussed above, each of these parameters involves a trade-off between achieving quicker RPOs and potential resource allocation. The action 140 following the initial trigger 130 can entail fine-tuning one or more of the aforementioned parameters. In some embodiments, each of the agents 110 has a number of actions that can be performed to increase, decease, keep constant, or otherwise change the respective parameter. Some embodiments allocate each agent 110 exclusively to fine-tune a specific parameter from the discussed set. Alternatively, other embodiments task each agent 110 with tuning multiple parameters, ensuring there is no overlap in the assigned parameters between agents. However, in some embodiments, there can be instances where different agents 110 are tasked with tuning parameters that directly overlap, or circumstances arise where adjustments made by one agent to a specific parameter can inadvertently affect the outcomes of an action prescribed by another agent. For example, if one agent is tasked with optimizing replication frequency and another is focused on bandwidth allocation, the actions of the two agents can inadvertently overlap. The increased replication frequency might demand more bandwidth, potentially impacting the bandwidth allocation agent's optimization efforts.

To address this potential for overlap and to ascertain that the actions of the various agents complement each other, in some embodiments, the automated tuner 120 can use a weighting function module 122 to determine an action based on the potentially conflicting recommendations from the various agents 110. A weighted function, for example, is a mathematical algorithm that assigns relative importance or influence to different inputs or factors in a decision-making process. In the context of agents recommending actions, a weighted function can be employed by the weighting function module 122 to make a final decision when there are conflicting recommendations between the machine learning agents 110. The recommendations of each of the machine learning agents 110 is assigned a weight based on its perceived reliability, expertise, or relevance in the current context. For example, an agent 110 associated with a parameter of high importance (e.g., a bandwidth allocated to the disaster recovery preparation service) can be assigned a higher weight. The weighting function module 122 aggregates the recommendations from all agents 110 by multiplying each recommendation by its assigned weight. This process creates a weighted sum that reflects the combined influence of all agents 110. The weighted sum can be compared against a threshold or threshold function. This threshold represents a criterion that must be met for an action to be executed. If there are conflicting recommendations from different agents 110 (e.g., some agents 110 recommend Action A while others recommend Action B), the weighting function module 122 balances the influence of agents 110 making the conflicting recommendations. The decision will be influenced by the relative weights, allowing for a more nuanced evaluation. In some embodiments, the weights assigned to agents 110 can be adjusted based on the specific context or requirements. For example, in certain situations, the influence of a particular agent 110 can be increased or decreased to align with the current priorities. In some embodiments, the weighting function module 122 adapt dynamically to changing conditions. As the situation evolves, the weights can be recalibrated to reflect the shifting importance of recommendations from different agents 110. In some embodiments, the weighting function module 122 can incorporate feedback mechanisms to continuously refine the weights over time. This ensures that the decision-making process becomes more accurate and aligned with the desired outcomes.

In some embodiments, as indicated above, the weighting function module 122 can also be configured to employ fuzzy logic techniques. Fuzzy logic techniques are concerned with reasoning and decision-making in situations that involve uncertainty and imprecision. In the context of the machine learning agents 110 where potentially conflicting actions are recommended by different agents, fuzzy logic can be used by the weighting function module 122 in the decision-making process. For example, in some embodiments, fuzzy sets can be defined to represent the degrees of membership of each agent's recommendation in a particular action category (e.g., Low, Medium, High). Thereafter, membership functions are established that describe how each recommendation belongs to different categories. These functions map the degree of membership. A fuzzy inference system can be created by determining rules that govern how the recommendations from the agents should be combined. These rules can be expressed in the form of "if-then" statements. Each rule can specify the relationship between the input recommendations and the resulting action. The membership functions for each recommendation from an agent 110 can be evaluated based on the defined rules. The evaluation process combines the fuzzy inputs. Subsequently, defuzzification is performed whereby the fuzzy output (which represents the collective recommendation) is converted into a crisp value that corresponds to a specific action. Fuzzy logic can, therefore, be adept at handling conflicting recommendations. Instead of forcing a binary decision, fuzzy logic allows for a gradation of choices. By employing fuzzy logic, the automated tuner 120 can make nuanced decisions even when recommendations between the various agents 110 conflict.

In some embodiments, the transition probabilities module 118 defines the likelihood of transitioning from one state to another and is used in determining the appropriate action 140. As explained above, states represent specific configurations or conditions of the storage systems and disaster recovery system (e.g., the state of the storage systems 190 and disaster recovery preparation service 170 can be indicated by the metrics 150 and the state 160 received by the automated tuner 120). The transition probabilities guide how likely the system is to move from its current state to a different state after taking a particular action determined by the action space module 112. The transition probabilities module 118 quantifies the probability distribution of possible state transitions when an action is taken.

In some embodiments, the action 140 received from the automated tuner 120 is implemented by the disaster recovery preparation service 170. In response, to implementing the action 140, a set of performance metrics and a new state associated with the disaster recovery preparation service is generated.

As noted previously, the performance metrics can be monitored and store in the storage system performance metrics module 174 associated with the storage system performance metrics, while the state related parameters and metrics can be stored in the storage system state parameters and metrics module 176 associated with the storage system state parameters and metrics. The performance metrics can be transmitted as metrics 150 to the automated tuner 120. The performance metrics provides information regarding the overall health of the storage systems 190 to the automated tuner 120. Similarly, the new state parameters and metrics generated in response to implementing the action 140 can be transmitted as state 160 to the automated tuner 120. The performance metrics stored by the storage system performance metrics module 174 can include, but are not limited to, the following:

Latency: In a disaster recovery scenario, latency would be the time it takes for a piece of data to be replicated from a primary storage system (source) to a secondary storage system (destination) by the disaster recovery preparation service 170 in the event of a disaster. The average latency of the snapshot and replication operations per the amount of data replicated can be computed. High latency in this context means that there is a significant delay in data replication, which can potentially impact the system's ability to meet recovery objectives.

Bandwidth: Bandwidth refers to the maximum rate of data transfer across a network. In disaster recovery systems, bandwidth measures how much data can be transmitted from the source to the destination within a given time frame. Higher bandwidth allows for faster data replication.

Throughput: Throughput is the actual amount of data that is successfully transmitted over a network within a specific period. The throughput takes into account factors like network congestion and protocol efficiency. In disaster recovery, high throughput ensures that data is replicated efficiently.

Replication throughput: The replication throughput measures the rate at which data is being replicated from the primary system (source) to the secondary system (target) by the disaster recovery preparation service 170. The replication throughput is a key indicator of how efficiently the replication process is functioning. Analyzing replication throughput provides information regarding whether data is being copied over to the secondary system in a timely and efficient manner. A higher throughput indicates faster replication, which is important in meeting Recovery Point Objectives (RPOs) and ensuring that the secondary system is up to date with the primary system's data. Conversely, a low replication throughput could lead to delays in data synchronization and potentially impact the overall effectiveness of the disaster recovery process.

Packet Loss: Packet loss is the percentage of data packets that are transmitted but do not reach their destination due to network congestion or errors. In disaster recovery, minimizing packet loss is crucial to ensure that all data is successfully replicated.

Jitter: Jitter refers to the variation in packet arrival times at the destination. Inconsistent arrival times can lead to data arriving out of order. In disaster recovery, low jitter ensures that replicated data is received in the correct sequence.

Round-Trip Time (RTT): RTT measures the time it takes for a signal or packet to travel from the source to the destination and back. In disaster recovery, a low RTT indicates efficient communication between the primary and secondary storage systems.

- Congestion: Congestion occurs when there is a high volume of data being transmitted through a network, leading to slower data transfer rates. Monitoring congestion helps ensure that data replication is not impeded by network traffic.
- Number of outstanding replications: The number of outstanding replications is another important performance metric in a disaster recovery scenario. This metric refers to the total number of replication tasks that are currently in progress but have not yet been completed. Analyzing the number of outstanding replications provides insight into the workload of the replication system. If the number is consistently high, it can indicate that the replication system is struggling to keep up with the volume of data that needs to be replicated. This can potentially lead to delays in data synchronization and could affect the ability to meet Recovery Point Objectives (RPOs).
- Storage Availability: This metric assesses the accessibility of the storage systems. It measures whether the storage systems are online and operational, ensuring that data can be written to and read from them during replication. The storage availability also Indicates the amount of free space on storage devices, ensuring sufficient capacity for replication.
- CPU Usage: CPU usage indicates the percentage of a capacity of a processor that is currently in use. Monitoring CPU usage helps ensure that the system has enough processing power to handle the replication tasks without being overburdened.
- Memory Usage: Memory usage measures the percentage of available memory being utilized for snapshot and replication operations. It's important to ensure that sufficient memory is available for caching and buffering during data replication.
- I/O Operations: I/O operations per second (IOPS) assess the rate at which data is read from or written to storage devices. Monitoring IOPS helps determine if the storage subsystem can keep up with the data replication demands.
- Number of Alerts: Monitoring the number of alerts received is an important metric in disaster recovery systems. This metric helps assess the overall health and stability of the system. A high number of alerts can indicate potential issues or failures that need attention, while a consistently low number can suggest a well-functioning system. Analyzing these alerts can help in identifying and addressing potential problems before they escalate into more significant issues.

In some embodiments, the metrics 150 and the state 160 received from the disaster recovery preparation service 170 in response to the initial action 140 are received by each of the machine learning agents 110. The reward function module 116 in each agent 110 determines the feedback in response to the action recommended by the machine learning agent 110. The reward function module 116 of each machine learning agent 110 combines the performance metrics 150 and the current state 160 to determine how much reward or penalty to assign to the machine learning agent 110. For example, the reward function module 116 can assign a numerical value, known as the reward, based on the impact of the action (e.g., the action 140 and any subsequent actions) on the performance of the storage system. In this context, a higher reward indicates a more desirable outcome. For instance, if the action leads to a reduction in recovery time or resource usage, it would be associated with a positive reward. Conversely, actions resulting in extended recovery times or resource strain might yield a lower reward or a penalty. In this way, rewards and penalties assigned by the reward function module 116 can be used to train the respective machine learning agent 110.

In some embodiments, where each machine learning agent 110 exclusively tunes one or more parameters, the entire reward (or penalty) computed by a respective reward function module 116 can be applied to the machine learning agent 110. The agent can then apply the reward (or penalty) to the action, which changes how the agent will choose an action in the future. In other embodiments, where there is overlap between the agents with respect to the parameters tuned (e.g., where multiple agents can tune the same parameters) the respective reward function modules 116 can divide the reward or penalty between the agents 110.

In the context of training multiple agents 110 for disaster recovery service parameter tuning, in some embodiments, it is possible for the multiple agents 110 to share the same problem state. However, in some embodiments, each agent 110 can have a distinct reward function tailored to its specific objectives and considerations. This allows the machine learning agents 110 to navigate the problem state in a manner that aligns with their individual optimization goals. This approach enables a more nuanced and specialized response to the conditions of the disaster recovery system, as each agent's unique reward function allows it to prioritize certain outcomes or performance metrics over others. In other embodiments, however, the multiple agents 110 can share the problem state and a single reward function. In such embodiments, because the agents all share the same reward function, there is low to no likelihood of any conflicts in actions being recommended by the various agents.

As noted above, the action space module 112 defines the set of actions that each machine learning agent 110 can take at each step. These actions correspond to adjustments or configurations that can be made to the parameters of the disaster recovery preparation service 170. For example, as discussed above, changing parameters such as replication frequency, adjusting bandwidth allocation, or modifying snapshot schedules could be examples of actions taken by the action space module 112. In some embodiments, the action space module 112 utilizes the computed reward from the reward function module 116 and transition probabilities from the transition probabilities module 118 to analyze the metrics 150 and the current state 160 from the disaster recovery preparation service 170 to decide the next action. In other words, the transition probabilities computed by the transition probabilities module 118 in conjunction with the reward computed by reward function module 116 are used by the machine learning agent 110 to learn the consequences of its actions and make informed decisions.

In some embodiments, the computed reward/penalty changes the transition probabilities computed by the transition probabilities module 118, which, in turn, changes the actions the respective agent 110 recommends in the future based on receiving an updated state 160. In other words, the reward/penalty computed can change how the respective agent 110 recommends a new set of tuning parameters that would be applied to the disaster recovery preparation service 170. Further, the one or more machine learning models associated with the agents 110 are also updated. In some embodiments, this process can be continued iteratively until a desired parameter setting is reached. In some embodiments, the parameter setting is adjusted further when a subsequent alert detecting a failure to meet an RPO is received.

The components of each machine learning agent 110 (e.g., the action space module 112, the state space module 114, the reward function module 116 and the transition probabilities module 118) work together to enable the machine learning agent to iteratively adjust parameters in response to the state of the disaster recovery preparation service 170. The action space module 112 provides options for modifications to the disaster recovery preparation service 170, the state space module 114 supplies information about the current system state, the reward function module 116 evaluates the impact of those modifications, and the transition probabilities module 118 helps in understanding the potential state changes resulting from the chosen action. Through repeated interactions with the disaster recovery preparation service 170, the machine learning agent 110 learns to make parameter adjustments that lead to improved performance based on the defined rewards.

In some embodiments, the machine learning agents 110 can continue to monitor the disaster recovery preparation service 170 and the storage systems 190, and iteratively adjust parameters by applying further actions as necessary (e.g., if subsequent alerts are generated). The frequency with which the action space module 112 applies adjustments or modifications to the disaster recovery preparation service 170 depends on several factors. These factors can include the dynamic nature of the disaster recovery preparation service 170, changes in workload, shifts in network conditions, and updates to the infrastructure or configuration of the system. Additionally, the frequency is influenced by the desired level of responsiveness to evolving conditions and the specific goals set for the disaster recovery process. Therefore, the frequency of adjustments will be determined by the specific requirements and characteristics of the storage systems 190 being managed.

Figure 3:
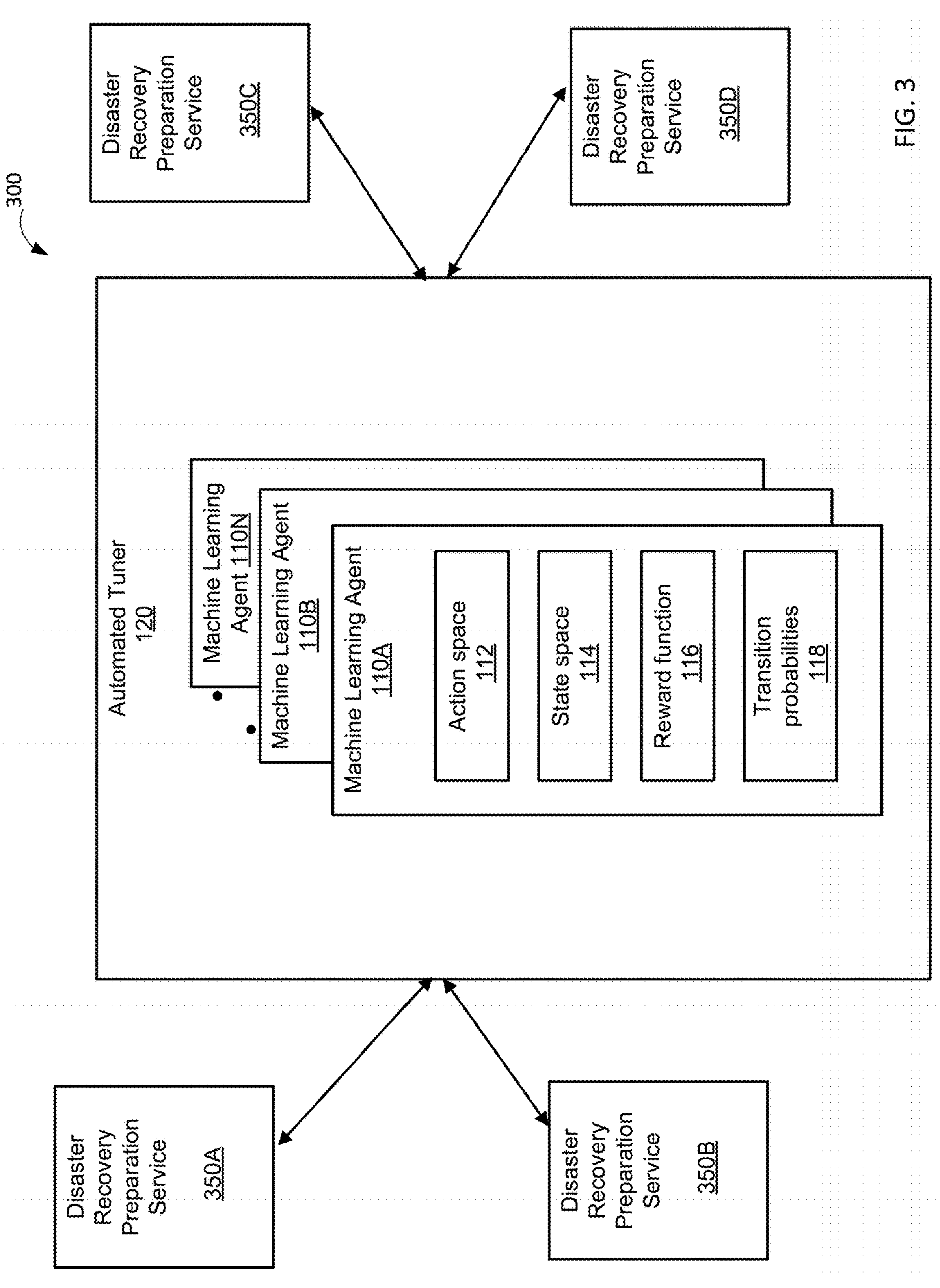
FIG. 3 is a block diagram illustrating a system for training an automated tuner using data from one or more disaster recover preparation services, according to various embodiments.

FIG. 3 is a block diagram illustrating a system 300 for training an automated tuner using data from one or more disaster recover preparation services, according to various embodiments. As shown in FIG. 3, the automated tuner 120, which performs substantially the same functions as the automated tuner 120 of FIG. 1, can be communicatively coupled with one or more disaster recovery preparation services (e.g., disaster recovery preparation service 350A, 350B . . . 350D etc.).

In some embodiments, the automated tuner undergoes training utilizing data from various disaster recovery preparation services 350, each corresponding to distinct sets of storage systems belonging to different clients. The agents 110 within the automated tuner can be trained in any one of several different ways. In some embodiments, each agent 110 is trained using a disaster recovery preparation service 350 associated with a single client. For example, agent 110A can be trained using the disaster recovery preparation service 350A, while agent 110B can be trained using the disaster recovery preparation service 350B. Each agent 110 is, therefore, trained in isolation and separately from the other agents 110.

In other embodiments, multiple agents can be trained across multiple clients. For example, agent 110A can be trained across disaster recovery preparation services 350A, 350B . . . 350D. Meanwhile, agent 110B can be trained across services 350A and 350B. The agents are flexible in their training arrangements and can be exposed to any combination of disaster recovery preparation services, potentially encompassing the entirety of available services.

In cases where one or more agents 110 are trained using diverse disaster recovery services linked to distinct clients, federated learning emerges as a potential approach that can be used in conjunction with reinforcement learning. Federated learning allows an agent 110 to learn from multiple sources while preserving data privacy and security. By employing federated learning, the agent 110 can collaboratively train across various disaster recovery services associated with different clients. This not only facilitates the acquisition of broad and comprehensive knowledge but also respects the confidentiality of each client's specific data. Through federated learning, the agent gains insights and expertise from a wide array of scenarios, ultimately enhancing its adaptability and proficiency in optimizing disaster recovery parameters across different environments. Federated learning operates on a decentralized premise, ensuring that sensitive data remains on the client's side. Instead of sending raw data to a central server for training, the model is brought to the data. Each client, in this case, a disaster recovery service associated with a specific client, retains its data and computes an updated model based on its local dataset. Only these model updates, typically in the form of gradients, are then shared with the central server. The server aggregates these updates across all clients to create a global model. Importantly, the server never directly accesses or stores any client-specific data. This process not only safeguards the privacy and security of each client's information but also allows for robust model training across a distributed network of services.

In some embodiments, one or more of the agents (e.g., agents 110A, 110B, . . . 110N) can initially undergo training using a specific service, such as disaster recovery preparation service 350A. Subsequently, as new services, like disaster recovery preparation service 350B, are introduced, these agents are capable of both parameter tuning for the new service and further self-training based on insights gained from it. This adaptable approach ensures that agents stay up to date with evolving services.

In some embodiments, in the event that a new disaster recovery preparation service (e.g., a service 350E not depicted in FIG. 3) becomes operational and is integrated with the automated tuner 120, the tuner can adapt to the unique workload associated with this new service, drawing from the training gleaned from the existing disaster recovery preparation services 350. As a result, the automated tuner 120 is more quickly and efficiently able to tune the storage system associated with the new disaster recovery preparation service to meet the requisite RPOs and RTOs, as compared with manual techniques.

In some embodiments, individual agents 110 within the automated tuner 120 can receive specialized training tailored to specific types of storage systems. This means that one or more agents 110 can be exclusively designated for training related to a specific category of storage systems. In the event that a disaster recovery service linked with this particular type of storage system becomes operational, the agents trained for that category can be engaged to fine-tune the parameters specifically for that disaster recovery system.

As mentioned above, in some embodiments, each agent (e.g., agent 110A and 110B) specializes in exclusively tuning one or more parameters. For instance, agent 110A could be dedicated to optimizing the number of concurrent snapshots, while agent 110B focuses on fine-tuning the allocation of local memory for replication. Conversely, in other configurations, agents can collectively train to adjust multiple parameters, potentially leading to some overlap. In these cases, agents work in tandem, performing adjustments simultaneously. As detailed previously, to handle potential conflicts, a weighted function and/or fuzzy logic can be employed, ensuring harmonized decision-making among the agents.

Exemplary Process Overview

Figure 4:
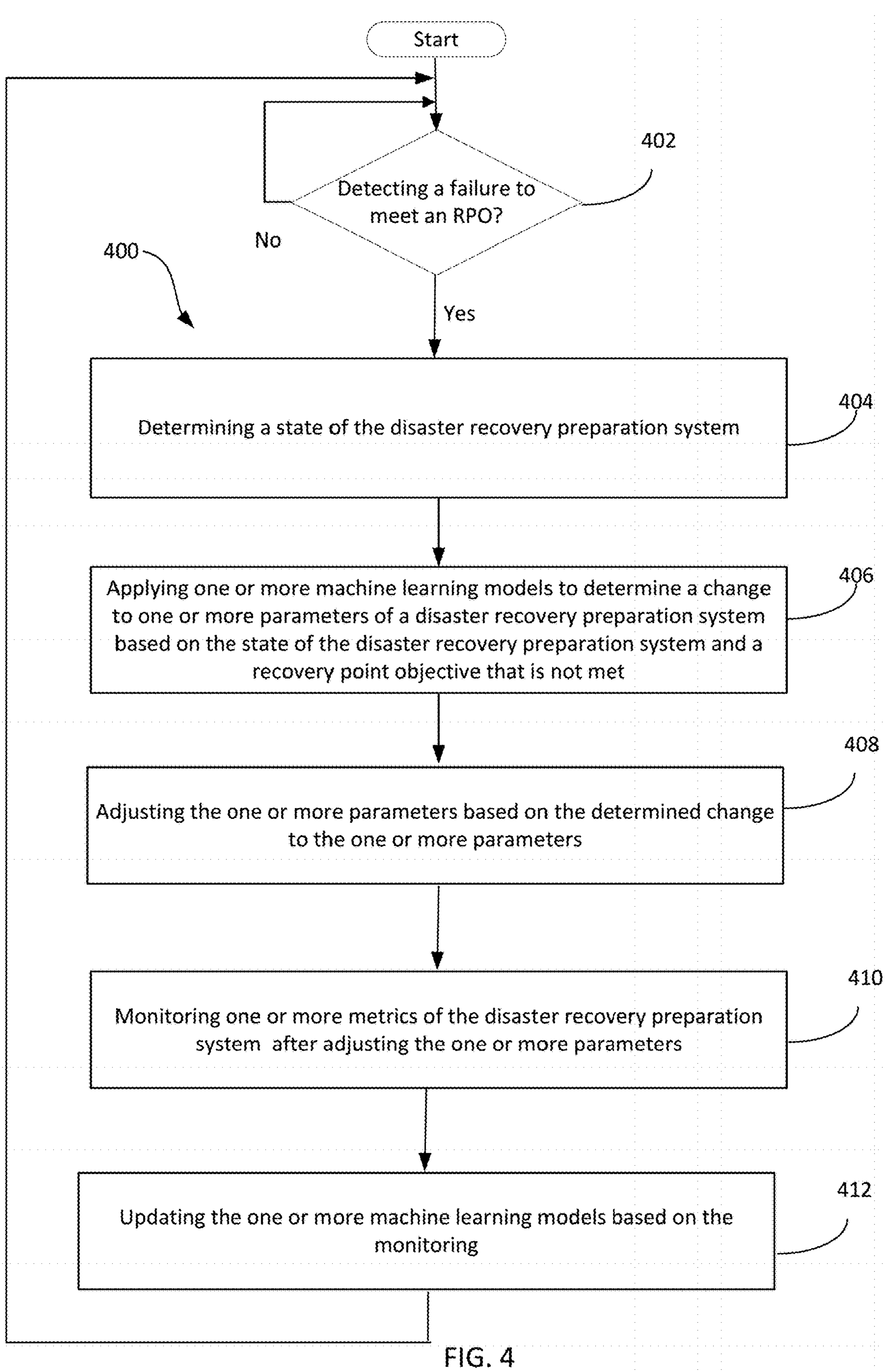
FIG. 4 is a flow diagram of method steps for dynamically tuning the parameters of a disaster recovery preparation service using a machine learning model, according to various embodiments.

FIG. 4 is a flow diagram of method steps for dynamically tuning the parameters of a disaster recovery preparation service using a machine learning model, according to various embodiments. The method steps of FIG. 4 can be performed by any computing device, such as any of the computing systems disclosed in FIGS. 5A-6. Furthermore, although the method steps are described with reference to the system of FIGS. 1, 2 and 3, persons skilled in the art will understand that any system configured to implement the method steps, in any order, falls within the scope of the present invention.

As shown in FIG. 4, a method 400 begins at a step 402, where an automated tuner 120 detects whether there is an alert associated with a failure to meet an RPO transmitted by a disaster recovery preparation service 170. As long as no alert is detected, the process continues to cycle back to step 402. An alert is typically sent by a disaster recovery preparation service (e.g., disaster recovery preparation service 170) when the associated storage system 190 fails to achieve the desired RPO. This can occur due to various factors such as network latency, data transfer delays, or technical issues within the replication process. Such alerts serve as critical notifications to inform stakeholders that the system's data recovery capabilities may not be meeting the specified objectives, potentially indicating a need for adjustments or enhancements to the disaster recovery plan.

Once an alert is detected at step 402, the method continues to step 404, where the automated tuner determines a state associated with the disaster recovery preparation service 170. Referring to FIG. 1, for example, a state 160 of the storage system 190 is transmitted from the disaster recovery preparation service 170 to the automated tuner 120, where it is stored in the state space module 114 to be analyzed. As indicated above, the state information can comprise parameters and metrics regarding the state of the storage system and can, in part, be received from the storage system state parameters and metrics module 176 associated with monitoring and storing state parameters and metrics.

At step 406, one or more machine learning models associated with machine learning agents 110 are applied to determine a change to one or more parameters of the disaster recovery preparation service 170 based on the received state 160 of the disaster recovery preparation service and the RPO alert that was not met. In some embodiments, the machine learning models can comprise a reinforcement learning model. For example, the action space module 112 of a machine learning agent 110 determines and analyzes a set of actions that are available to influence the state using the information received by the state space module 114 of the machine learning agent 110. The action space module 112 then selects an action 140 to be performed. Note that the transition probabilities module 118 can be used in conjunction with the action space module 112 to determine the one or more tuning steps to be applied to the disaster recovery preparation service 170. The transition probabilities module 118 is responsible for modeling the likelihood of transitioning from one state to another in the environment. The transition probabilities module 118 quantifies the probability distribution of possible state transitions when an action is taken. The transition probabilities module 118 provides the probabilities associated with transitioning to each possible state given the current state and the action taken. These probabilities are essential for the agent 110 to estimate the expected outcomes of different actions.

Note that, as discussed above, in order to address the potential for overlap in the actions determined by one or more agents 110, in some embodiments, the automated tuner 120 uses the weighting function module 122 to determine an action based on the potentially conflicting recommendations. A weighted function, for example, is a mathematical algorithm that assigns relative importance or influence to different inputs or factors in a decision-making process. In the context of agents 110 recommending actions, a weighted function can be employed by the weighting function module 122 to make a final decision when there are conflicting recommendations between the machine learning agents 110.

At step 408, one or more parameters are adjusted by the disaster recovery preparation service 170 based on the determined change to the one or more parameters. The action, for example, can be one or more tuning steps to be applied to the disaster recovery preparation service 170. In some embodiments, the action 140 to be performed includes tuning or modifying, for example, a bandwidth allocated to the disaster recovery preparation service 170, modifying a time of replication, staggering batches at different times, etc.

At step 410, one or more metrics (e.g., performance metrics monitored by the storage system performance metrics module 174 of FIG. 1) of the disaster recovery preparation service 170 are monitored after adjusting the one or more parameters. As explained above, the performance metrics such as latency, throughput, bandwidth utilization, etc. are monitored and a reward function module 116 combines the performance metrics and the state parameters to determine how much reward or penalty to assign to the respective agents. For example, the reward function module 116 can assign a numerical value, known as the reward, based on the impact of the action (e.g., the action 140 and any subsequent actions) on the performance of the storage system. For instance, if the action leads to a reduction in recovery time or resource usage, it would be associated with a positive reward. Conversely, actions resulting in extended recovery times or resource strain might yield a lower reward or a penalty. In this way, rewards and penalties assigned by the reward function module 116 can be used to train the respective machine learning agent 110.

At step 412, the one or more machine learning models associated with the agents 110 are updated based on the rewards and penalties computed above. As noted previously, the reward function module 116 of each machine learning agent 110 combines the performance metrics 150 and the parameters associated with the state 160 to determine how much reward or penalty to assign to the machine learning agent 110. For example, the reward function module 116 can assign a numerical value, known as the reward, based on the impact of the action (e.g., the action 140 and any subsequent actions) on the performance of the storage system. In this context, a higher reward indicates a more desirable outcome. For instance, if the action leads to a reduction in recovery time or resource usage, it would be associated with a positive reward. Conversely, actions resulting in extended recovery times or resource strain might yield a lower reward or incur a penalty. In this way, rewards and penalties assigned by the reward function module 116 can be used to train the respective machine learning agent 110.

Thereafter, the automated tuner can continue to wait at step 402 until the next alert is detected.

Exemplary Virtualization System Architectures

According to some embodiments, all or portions of any of the foregoing techniques described with respect to FIGS. 1-4 can be partitioned into one or more modules and instanced within, or as, or in conjunction with a virtualized controller in a virtual computing environment. Some example instances within various virtual computing environments are shown and discussed in further detail in FIGS. 5A-5D. Consistent with these embodiments, a virtualized controller includes a collection of software instructions that serve to abstract details of underlying hardware or software components from one or more higher-level processing entities. In some embodiments, a virtualized controller can be implemented as a virtual machine, as an executable container, or within a layer (e.g., such as a layer in a hypervisor). Consistent with these embodiments, distributed systems include collections of interconnected components that are designed for, or dedicated to, storage operations as well as being designed for, or dedicated to, computing and/or networking operations.

In some embodiments, interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

In some embodiments, a hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

In some embodiments, physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

Figure 5A:
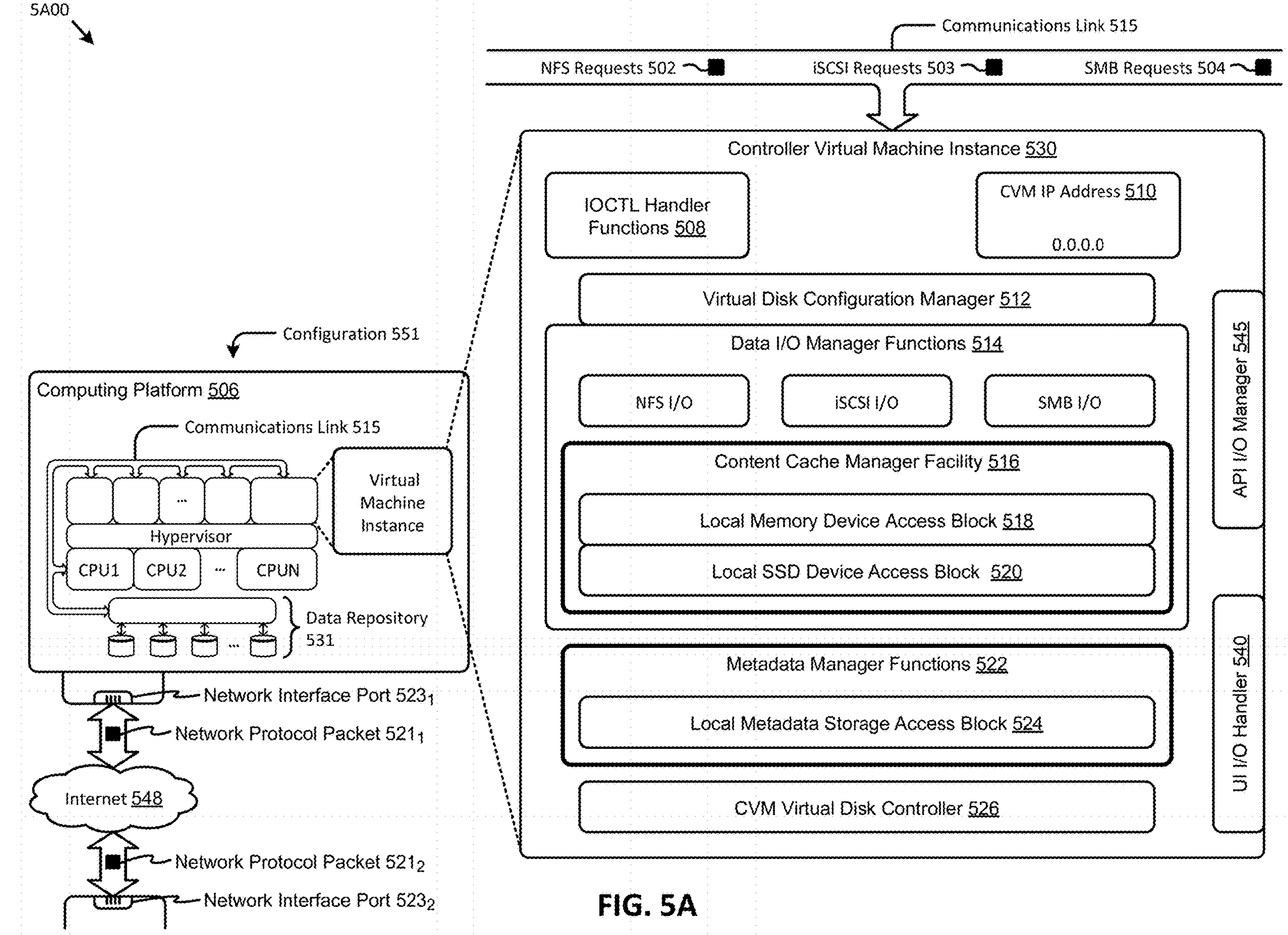
FIGS. 5A-5D are block diagrams illustrating virtualization system architectures configured to implement one or more aspects of the present embodiments.

FIG. 5A is a block diagram illustrating virtualization system architecture 5A00 configured to implement one or more aspects of the present embodiments. As shown in FIG. 5A, virtualization system architecture 5A00 includes a collection of interconnected components, including a controller virtual machine (CVM) instance 530 in a configuration 551. Configuration 551 includes a computing platform 506 that supports virtual machine instances that are deployed as user virtual machines, or controller virtual machines or both. Such virtual machines interface with a hypervisor (as shown). In some examples, virtual machines may include processing of storage I/O (input/output or IO) as received from any or every source within the computing platform. An example implementation of such a virtual machine that processes storage I/O is depicted as CVM instance 530.

In this and other configurations, a CVM instance receives block I/O storage requests as network file system (NFS) requests in the form of NFS requests 502, internet small computer storage interface (iSCSI) block IO requests in the form of iSCSI requests 503, Samba file system (SMB) requests in the form of SMB requests 504, and/or the like. The CVM instance publishes and responds to an internet protocol (IP) address (e.g., CVM IP address 510). Various forms of input and output can be handled by one or more IO control handler functions (e.g., IOCTL handler functions 508) that interface to other functions such as data IO manager functions 514 and/or metadata manager functions 522. As shown, the data IO manager functions can include communication with virtual disk configuration manager 512 and/or can include direct or indirect communication with any of various block IO functions (e.g., NFS IO, ISCSI IO, SMB IO, etc.).

In addition to block IO functions, configuration 551 supports IO of any form (e.g., block IO, streaming IO, packet-based IO, HTTP traffic, etc.) through either or both of a user interface (UI) handler such as UI IO handler 540 and/or through any of a range of application programming interfaces (APIs), possibly through API IO manager 545.

Communications link 515 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 506 include one or more computer readable media that is capable of providing instructions to a data processor for execution. In some examples, each of the computer readable media may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory (RAM). As shown, controller virtual machine instance 530 includes content cache manager facility 516 that accesses storage locations, possibly including local dynamic random access memory (DRAM) (e.g., through local memory device access block 518) and/or possibly including accesses to local solid state storage (e.g., through local SSD device access block 520).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 531, which in turn can be formatted into any one or more storage areas, and which can comprise parameterized storage accessible by a key (e.g., a filename, a table name, a block address, an offset address, etc.). Data repository 531 can store any forms of data, and can comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 524. The data repository 531 can be configured using CVM virtual disk controller 526, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., CPU1, CPU2, . . . , CPUN). According to certain embodiments of the disclosure, two or more instances of configuration 551 can be coupled by communications link 515 (e.g., backplane, LAN, PSTN, wired or wireless network, etc.) and each instance may perform respective portions of sequences of instructions as may be required to practice embodiments of the disclosure.

The shown computing platform 506 is interconnected to the Internet 548 through one or more network interface ports (e.g., network interface port 5231 and network interface port 5232). Configuration 551 can be addressed through one or more network interface ports using an IP address. Any operational element within computing platform 506 can perform sending and receiving operations using any of a range of network protocols, possibly including network protocols that send and receive packets (e.g., network protocol packet 5211 and network protocol packet 5212).

Computing platform 506 may transmit and receive messages that can be composed of configuration data and/or any other forms of data and/or instructions organized into a data structure (e.g., communications packets). In some cases, the data structure includes program instructions (e.g., application code) communicated through the Internet 548 and/or through any one or more instances of communications link 515. Received program instructions may be processed and/or executed by a CPU as it is received and/or program instructions may be stored in any volatile or non-volatile storage for later execution. Program instructions can be transmitted via an upload (e.g., an upload from an access device over the Internet 548 to computing platform 506). Further, program instructions and/or the results of executing program instructions can be delivered to a particular user via a download (e.g., a download from computing platform 506 over the Internet 548 to an access device).

Configuration 551 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 5B:
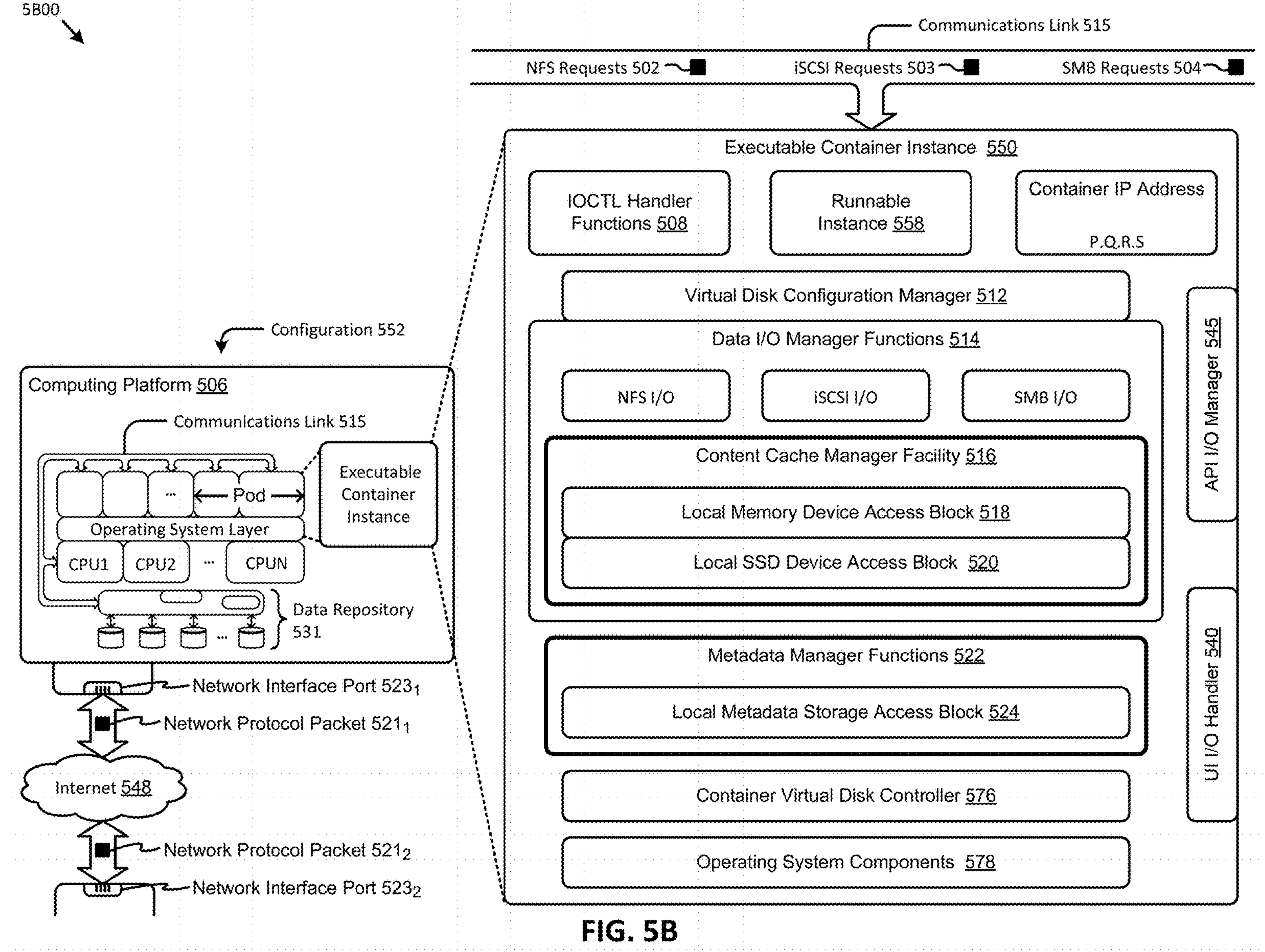

FIG. 5B depicts a block diagram illustrating another virtualization system architecture 5B00 configured to implement one or more aspects of the present embodiments. As shown in FIG. 5B, virtualization system architecture 5B00 includes a collection of interconnected components, including an executable container instance 550 in a configuration 552. Configuration 552 includes a computing platform 506 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 550). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a", etc.). The executable container might optionally include operating system components 578, however such a separate set of operating system components need not be provided. As an alternative, an executable container can include runnable instance 558, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 576. Such a container virtual disk controller can perform any of the functions that the aforementioned CVM virtual disk controller 526 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 5C:
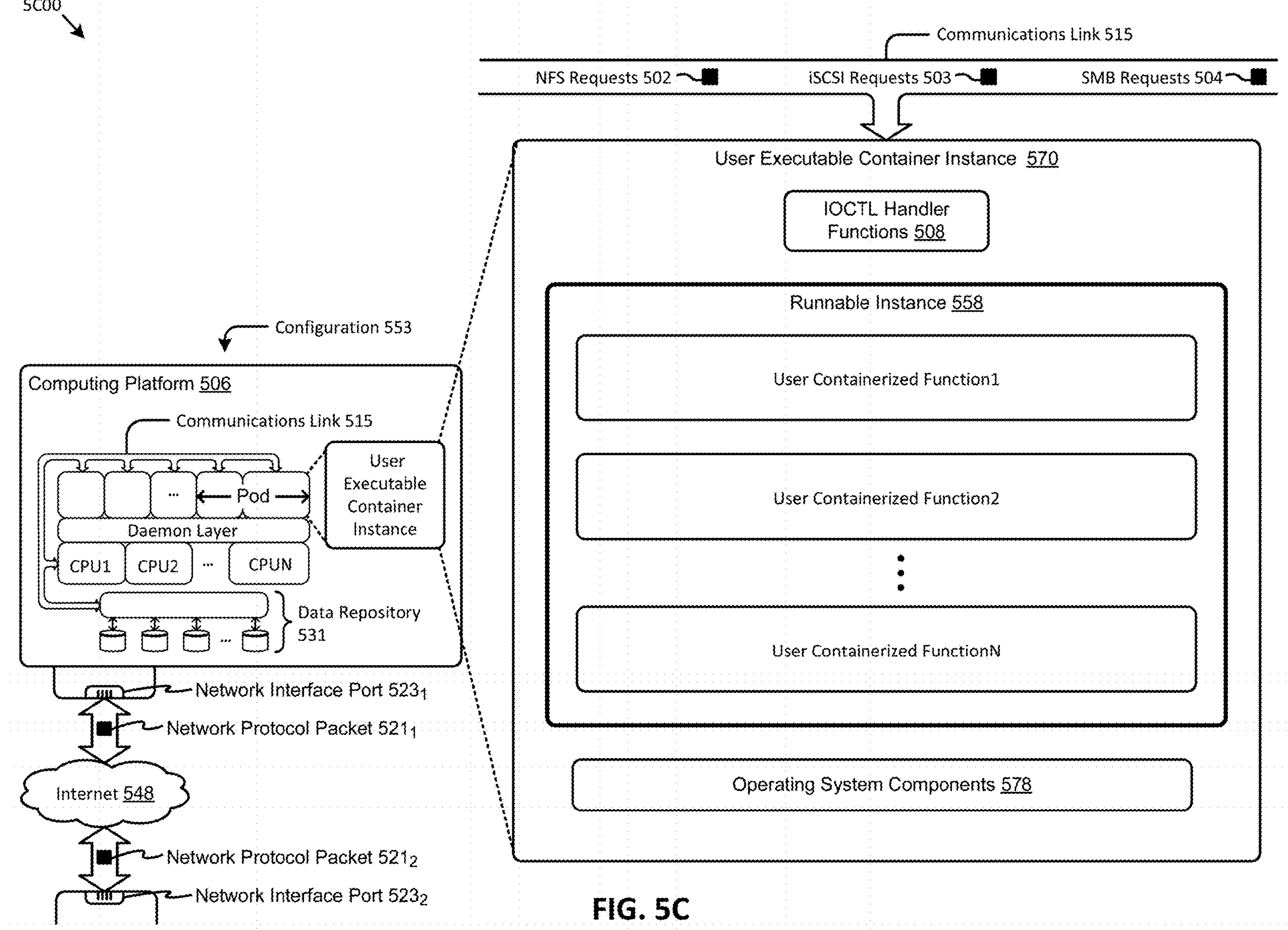

FIG. 5C is a block diagram illustrating virtualization system architecture 5C00 configured to implement one or more aspects of the present embodiments. As shown in FIG. 5C, virtualization system architecture 5C00 includes a collection of interconnected components, including a user executable container instance in configuration 553 that is further described as pertaining to user executable container instance 570. Configuration 553 includes a daemon layer (as shown) that performs certain functions of an operating system.

User executable container instance 570 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 558). In some cases, the shown operating system components 578 comprise portions of an operating system, which portions are interfaced with or included in the runnable instance and/or any user containerized functions. In some embodiments of a daemon-assisted containerized architecture, computing platform 506 might or might not host operating system components other than operating system components 578. More specifically, the shown daemon might or might not host operating system components other than operating system components 578 of user executable container instance 570.

In some embodiments, the virtualization system architecture 5A00, 5B00, and/or 5C00 can be used in any combination to implement a distributed platform that contains multiple servers and/or nodes that manage multiple tiers of storage where the tiers of storage might be formed using the shown data repository 531 and/or any forms of network accessible storage. As such, the multiple tiers of storage may include storage that is accessible over communications link 515. Such network accessible storage may include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiments, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 551) to manage the interactions between the underlying hardware and user virtual machines or containers that run client software.

Distinct from user virtual machines or user executable containers, a special controller virtual machine (e.g., as depicted by controller virtual machine instance 530) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines-above the hypervisors-thus, the approach of using such special virtual machines can be used and implemented within any virtual machine architecture.

Furthermore, the storage controllers can be used in conjunction with any hypervisor from any virtualization vendor and/or implemented using any combinations or variations of the aforementioned executable containers in conjunction with any host operating system components.

Figure 5D:
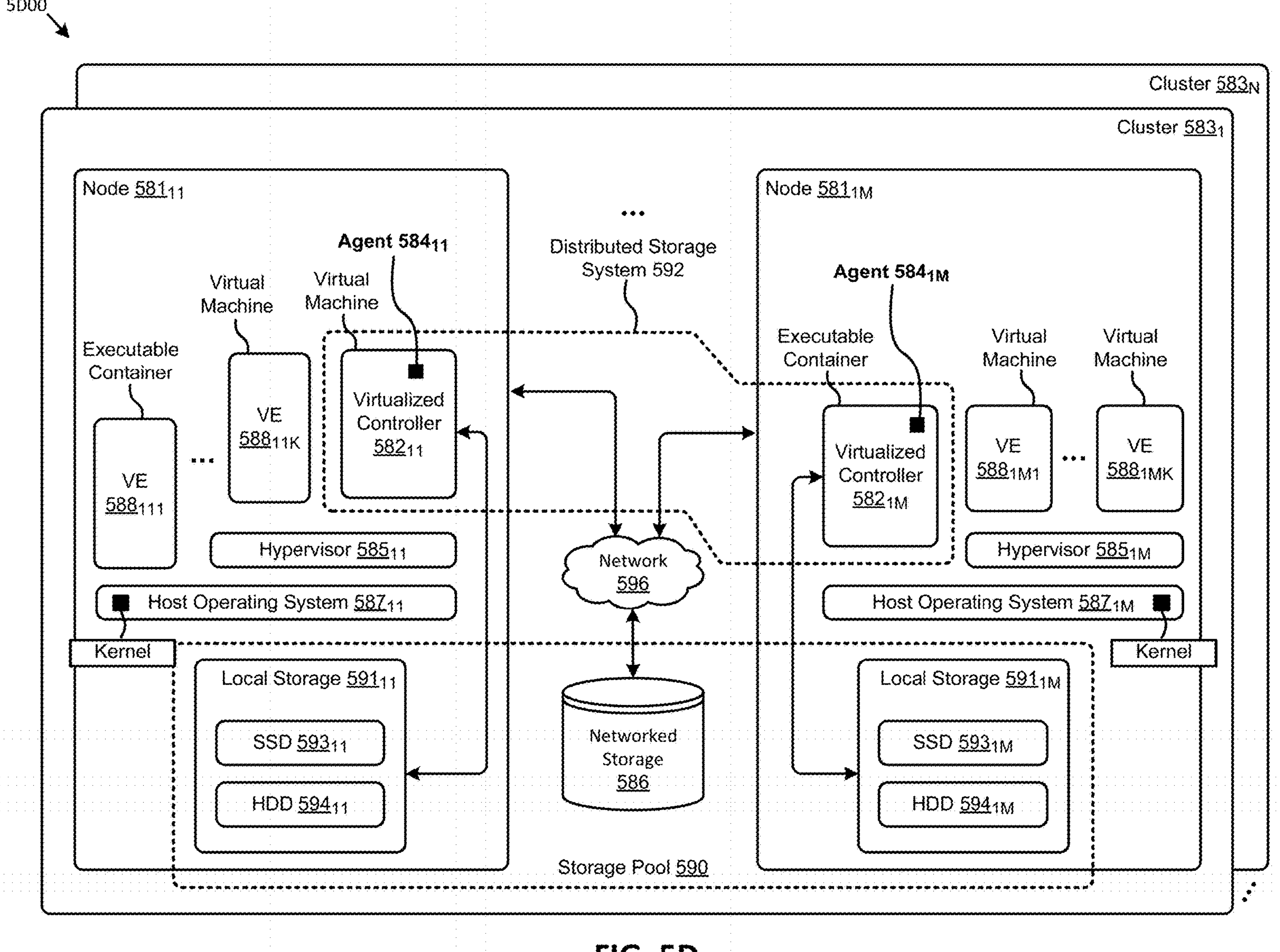

FIG. 5D is a block diagram illustrating virtualization system architecture 5D00 configured to implement one or more aspects of the present embodiments. As shown in FIG. 5D, virtualization system architecture 5D00 includes a distributed virtualization system that includes multiple clusters (e.g., cluster $\mathbf{583}_1$, . . . , cluster $\mathbf{583}_N$) comprising multiple nodes that have multiple tiers of storage in a storage pool. Representative nodes (e.g., node $\mathbf{581}_{11}$, . . . , node $\mathbf{581}_{1M}$) and storage pool 590 associated with cluster $\mathbf{583}_1$ are shown. Each node can be associated with one server, multiple servers, or portions of a server. The nodes can be associated (e.g., logically and/or physically) with the clusters. As shown, the multiple tiers of storage include storage that is accessible through a network 596, such as a networked storage 586 (e.g., a storage area network or SAN, network attached storage or NAS, etc.). The multiple tiers of storage further include instances of local storage (e.g., local storage $\mathbf{591}_{11}$, . . . , local storage $\mathbf{591}_{1M}$). For example, the local storage can be within or directly attached to a server and/or appliance associated with the nodes. Such local storage can include solid state drives (SSD $\mathbf{593}_{11}$, . . . , SSD $\mathbf{593}_{1M}$), hard disk drives (HDD $\mathbf{594}_{11}$, . . . , HDD $\mathbf{594}_{1M}$), and/or other storage devices.

As shown, any of the nodes of the distributed virtualization system can implement one or more user virtualized entities (e.g., VE $\mathbf{588}_{111}$, . . . , VE $\mathbf{588}_{11K}$, . . . , VE $\mathbf{588}_{1M1}$, . . . , VE $\mathbf{588}_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $\mathbf{587}_{11}$, . . . , host operating system $\mathbf{587}_{1M}$), while the VMs run multiple applications on various respective guest operating systems. Such flexibility can be facilitated at least in part by a hypervisor (e.g., hypervisor $\mathbf{585}_{11}$, . . . , hypervisor $\mathbf{585}_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system $\mathbf{587}_{11}$, . . . , host operating system $\mathbf{587}_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 590 by the VMs and/or the executable containers.

Multiple instances of such virtualized controllers can coordinate within a cluster to form the distributed storage system 592 which can, among other operations, manage the storage pool 590. This architecture further facilitates efficient scaling in multiple dimensions (e.g., in a dimension of computing power, in a dimension of storage space, in a dimension of network bandwidth, etc.).

In some embodiments, a particularly configured instance of a virtual machine at a given node can be used as a virtualized controller in a hypervisor-assisted virtualization environment to manage storage and I/O (input/output or IO) activities of any number or form of virtualized entities. For example, the virtualized entities at node $\mathbf{581}_{11}$ can interface with a controller virtual machine (e.g., virtualized controller $\mathbf{582}_{11}$) through hypervisor $\mathbf{585}_{11}$ to access data of storage pool 590. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 592. For example, a hypervisor at one node in the distributed storage system 592 might correspond to software from a first vendor, and a hypervisor at another node in the distributed storage system 592 might correspond to a second software vendor. As another virtualized controller implementation example, executable containers can be used to implement a virtualized controller (e.g., virtualized controller $\mathbf{582}_{1M}$) in an operating system virtualization environment at a given node. In this case, for example, the virtualized entities at node $\mathbf{581}_{1M}$ can access the storage pool 590 by interfacing with a controller container (e.g., virtualized controller $\mathbf{582}_{1M}$) through hypervisor $\mathbf{585}_{1M}$ and/or the kernel of host operating system $\mathbf{587}_{1M}$.

In some embodiments, one or more instances of an agent can be implemented in the distributed storage system 592 to facilitate the herein disclosed techniques. Specifically, agent $\mathbf{584}_{11}$ can be implemented in the virtualized controller $\mathbf{582}_{11}$, and agent $\mathbf{584}_{1M}$ can be implemented in the virtualized controller $\mathbf{582}_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Exemplary Computer System

Figure 6:
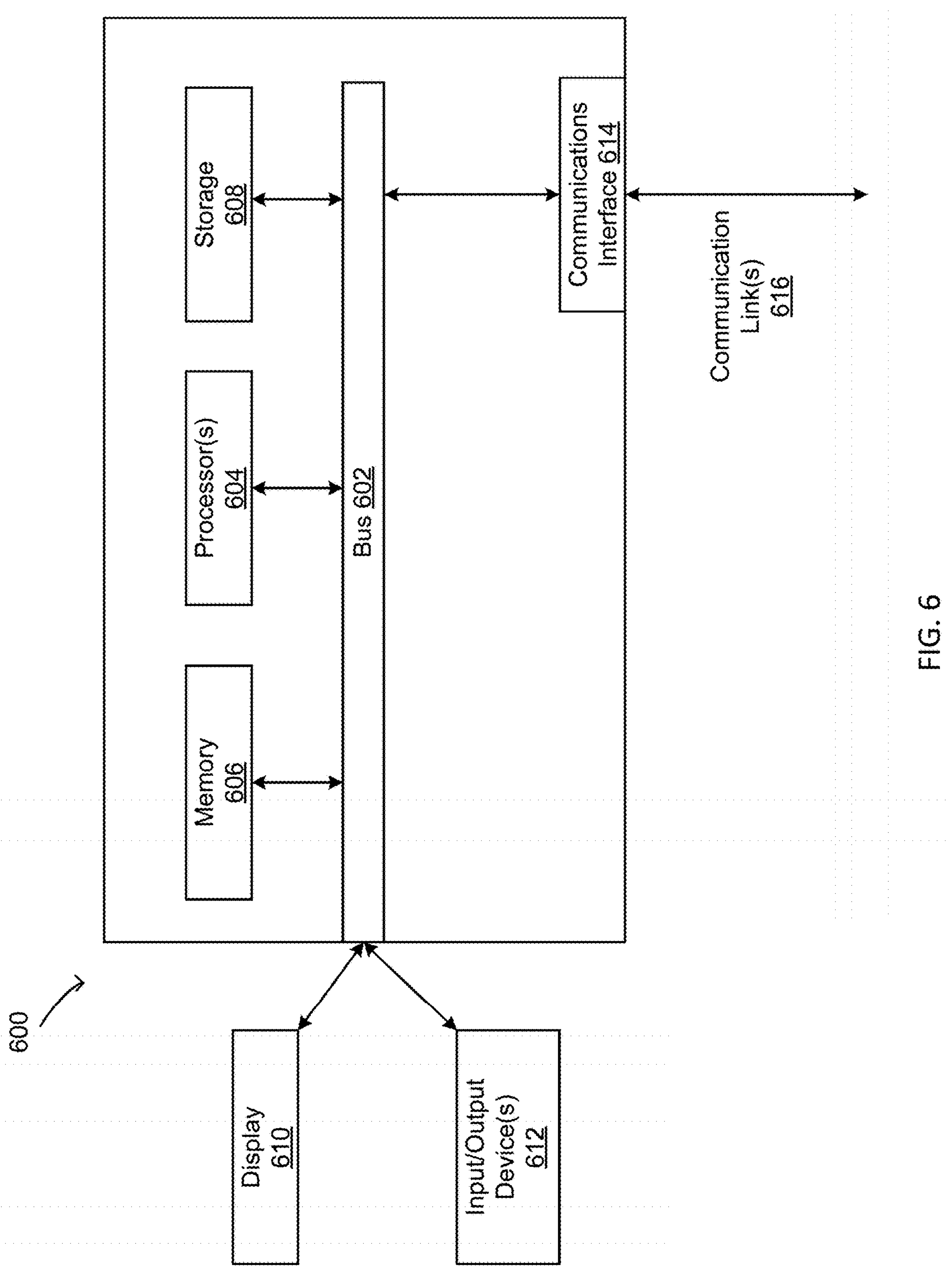
FIG. 6 is a block diagram illustrating a computer system configured to implement one or more aspects of the present embodiments.

FIG. 6 is a block diagram illustrating a computer system 600 configured to implement one or more aspects of the present embodiments. In some embodiments, computer system 600 may be representative of a computer system for implementing one or more aspects of the embodiments disclosed in FIGS. 1-5D. In some embodiments, computer system 600 is a server machine operating in a data center or a cloud computing environment. suitable for implementing an embodiment of the present disclosure. As shown, computer system 600 includes a bus 602 or other communication mechanism for communicating information, which interconnects subsystems and devices, such as one or more processors 604, memory 606, storage 608, optional display 610, one or more input/output devices 612, and a communications interface 614. Computer system 600 described herein is illustrative and any other technically feasible configurations fall within the scope of the present disclosure.

The one or more processors 604 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, the one or more processors 604 may be any technically feasible hardware unit capable of processing data and/or executing software applications. Further, in the context of this disclosure, the computing elements shown in computer system 600 may correspond to a physical computing system (e.g., a system in a data center) or may be a virtual computing instance, such as any of the virtual machines described in FIGS. 5A-5D.

Memory 606 includes a random access memory (RAM) module, a flash memory unit, and/or any other type of memory unit or combination thereof. The one or more processors 604, and/or communications interface 614 are configured to read data from and write data to memory 606. Memory 606 includes various software programs that include one or more instructions that can be executed by the one or more processors 604 and application data associated with said software programs.

Storage 608 includes non-volatile storage for applications and data, and may include one or more fixed or removable disk drives, HDDs, SSD, NVMes, vDisks, flash memory devices, and/or other magnetic, optical, and/or solid state storage devices.

Communications interface 614 includes hardware and/or software for coupling computer system 600 to one or more communication links 616. The one or more communication links 616 may include any technically feasible type of communications network that allows data to be exchanged between computer system 600 and external entities or devices, such as a web server or another networked computing system. For example, the one or more communication links 616 may include one or more wide area networks (WANs), one or more local area networks (LANs), one or more wireless (WiFi) networks, the Internet, and/or the like.

In sum, techniques for dynamically tuning the parameters of a disaster recovery preparation service using a machine learning model are presented. The techniques include detecting a failure to meet a recover point objective (RPO) associated with a disaster recovery preparation service. The techniques further include determining a state of the disaster recovery preparation service and applying one or more machine learning models to determine a change to one or more parameters of the disaster recovery preparation system based on the state of the disaster recovery preparation service and the RPO that is not met. Further, the techniques include adjusting the one or more parameters based on the determined change to the one or more parameters and monitoring one or more metrics of the disaster recovery preparation service after adjusting the one or more parameters. Subsequently, the techniques include updating the one or more machine learning models based on the monitoring. The techniques use a reinforcement learning model, where one or more machine learning agents adjust various parameters based on the state of the storage system and RPO adherence. This adaptability ensures that the system remains finely tuned to meet specific workload demands and changing conditions.

At least one technical advantage of the disclosed techniques relative to the prior art is that, with the disclosed techniques, parameters for a storage system can be tuned efficiently by using an automated tuner that monitors the storage system's performance, ensuring that Recovery Point Objectives (RPOs) are consistently met. This automation eliminates the need for manual intervention, saving valuable time and resources. As an example, the automated tuner uses a reinforcement learning model, comprising one or more machine learning agents, which allows the automated tuner to dynamically adjust various parameters based on the storage system's state and RPO adherence. This adaptability ensures that the system remains finely tuned to meet specific workload demands and changing conditions. Additionally, the ability of the automated tuner to swiftly adapt to different storage system environments and workloads is a notable advantage. By training on data from diverse storage systems and potentially fine-tuning for specific scenarios, the disclosed techniques offer a versatile and efficient solution for optimizing performance. Ultimately, the integration of the automated tuner streamlines disaster recovery processes, enhancing data resilience and reducing the time and effort typically associated with manual parameter tuning. The disclosed techniques, therefore, provide various improvements in the manner in which organizations safeguard their critical data assets, representing a significant advancement in automated disaster recovery preparation systems. These technical advantages provide one or more technological improvements over prior art approaches.

1. According to some embodiments, one or more non-transitory computer-readable media storing program instructions that, when executed by one or more processors, cause the one or more processors to perform a method for tuning a disaster recovery preparation system for a storage system comprising determining whether the disaster recovery preparation system has not met a recovery point objective; and in response to determining that the recovery point objective is not met: determining a state of the storage system; applying a machine learning model to determine a change to one or more of a plurality of adjustable parameters of the disaster recovery preparation system based on the state of the storage system and the recovery point objective that is not met; adjusting the one or more of the plurality of adjustable parameters based on the determined change to the one or more parameters; after adjusting the one or more parameters, monitoring one or more metrics of the disaster recovery preparation system or the storage system; and updating the machine learning model based on the monitoring, wherein the plurality of adjustable parameters comprise at least two of: a time window when disaster recovery preparation operations are performed; a bandwidth allocated to the disaster recovery preparation system; a priority assigned to the disaster recovery preparation system; or a number of snapshots that can be concurrently performed and replicated by the disaster recovery preparation system.

2. The one or more non-transitory computer readable media according to clause 1, wherein the disaster recovery preparation system performs snapshot and replication operations for the storage system.

3. The one or more non-transitory computer readable media according to any of clauses 1 or 2, wherein the state of the storage system comprises one or more parameters selected from a group consisting of: time of last backup; data integrity status; replication status; data synchronization status; volume and file system information; application availability; hardware health and status; network connectivity status; error and event logs, snapshot status; retention policy compliance; alerts and notifications; configuration details; and historical statistics.

4. The one or more non-transitory computer readable media according to any of clauses 1-3, wherein each of the one or more metrics are selected from a group consisting of: memory usage of the disaster recovery preparation system; availability of storage in the storage system; a number of outstanding replications; network congestion; an amount of time to complete snapshot and replication operations on the storage system; a number of alerts generated by the disaster recovery preparation system; average latency of the snapshot and replication operations per an amount of data replicated; an amount of data replicated per time unit; input/output operations (IOPS) rate of the storage system; a CPU utilization of the storage system; and a network bandwidth of the storage system.

5. The one or more non-transitory computer readable media according to clauses 1-4, wherein the machine learning model is a reinforcement learning model with multiple agents.

6. The one or more non-transitory computer readable media according to clauses 1-5, further comprising rewarding or penalizing each of the multiple agents according to a respective reward function that combines the one or more metrics.

7. The one or more non-transitory computer readable media according to clauses 1-6, wherein at least one of the multiple agents is exclusively trained using a disaster recovery preparation system associated with a particular client.

8. The one or more non-transitory computer readable media according to clauses 1-7, wherein at least one of the multiple agents is trained using a plurality of disaster recovery preparation systems associated with a respective plurality of clients.

9. The one or more non-transitory computer readable media according to clauses 1-8, wherein each of the multiple agents is trained to provide a recommendation to tune the one or more parameters, and wherein any conflicts between recommendations provided by different agents are resolved using a respective weighting function.

10. The one or more non-transitory computer readable media according to clauses 1-9, wherein each of the multiple agents is trained to provide a recommendation to tune the one or more parameters, and wherein any conflicts between recommendations provided by different agents are resolved using a respective function employing fuzzy logic principles.

11. The one or more non-transitory computer readable media according to clauses 1-10, wherein each of the multiple agents is trained to tune a different one of the at least two adjustable parameters.

12. The one or more non-transitory computer readable media according to clauses 1-11, where the plurality of adjustable parameters of the disaster recovery preparation system further comprises one or more parameters selected from a group consisting of: local memory usage allocated to the disaster recovery preparation operations; processing power allocated to the disaster recovery preparation operations; backup frequency associated with disaster recovery preparation operations; and data compression and deduplication associated with disaster recovery preparation operations.

13. According to some embodiments a computer-implemented method for tuning a disaster recovery preparation system for a storage system comprising determining whether the disaster recovery preparation system has not met a recovery point objective; and in response to determining that the recovery point objective is not met: determining a state of the storage system; applying a machine learning model to determine a change to one or more of a plurality of adjustable parameters of the disaster recovery preparation system based on the state of the storage system and the recovery point objective that is not met; adjusting the one or more of the plurality of adjustable parameters based on the determined change to the one or more parameters; after adjusting the one or more parameters, monitoring one or more metrics of the disaster recovery preparation system or the storage system; and updating the machine learning model based on the monitoring, wherein the plurality of adjustable parameters comprise at least two of: a time window when disaster recovery preparation operations are performed; a bandwidth allocated to the disaster recovery preparation system; a priority assigned to the disaster recovery preparation system; or a number of snapshots that can be concurrently performed and replicated by the disaster recovery preparation system.
14. The method according to clause 13, wherein the disaster recovery preparation system performs snapshot and replication operations for the storage system.
15. The method according to clauses 13-14, wherein the state of the storage system comprises one or more parameters selected from a group consisting of: time of last backup; data integrity status; replication status; data synchronization status; volume and file system information; application availability; hardware health and status; network connectivity status; error and event logs, snapshot status; retention policy compliance; alerts and notifications; configuration details; and historical statistics.
16. The method according to clauses 13-15, wherein each of the one or more metrics are selected from a group consisting of: memory usage of the disaster recovery preparation system; availability of storage in the storage system; a number of outstanding replications; network congestion; an amount of time to complete snapshot and replication operations on the storage system; a number of alerts generated by the disaster recovery preparation system; average latency of the snapshot and replication operations per an amount of data replicated; an amount of data replicated per time unit; input/output operations (IOPS) rate of the storage system; a CPU utilization of the storage system; and a network bandwidth of the storage system.
17. The method according to clauses 13-16, wherein the machine learning model is a reinforcement learning model with multiple agents.
18. The method according to clauses 13-17, further comprising rewarding or penalizing each of the multiple agents according to a respective reward function that combines the one or more metrics.
19. The method according to clauses 13-18, wherein at least one of the multiple agents is exclusively trained using a disaster recovery preparation system associated with a particular client.
20. The method according to clauses 13-19, wherein at least one of the multiple agents is trained using a plurality of disaster recovery preparation systems associated with a respective plurality of clients.
21. The method according to clauses 13-20, wherein each of the multiple agents is trained to provide a recommendation to tune the one or more parameters, and wherein any conflicts between recommendations provided by different agents are resolved using a respective weighting function.
22. The method according to clauses 13-21, wherein each of the multiple agents is trained to provide a recommendation to tune the one or more parameters, and wherein any conflicts between recommendations provided by different agents are resolved using a respective function employing fuzzy logic principles.
23. The method according to clauses 13-22, wherein each of the multiple agents is trained to tune a different one of the at least two adjustable parameters.
24. The method according to clauses 13-23, where the plurality of adjustable parameters of the disaster recovery preparation system further comprises one or more parameters selected from a group consisting of: local memory usage allocated to the disaster recovery preparation operations; processing power allocated to the disaster recovery preparation operations; backup frequency associated with disaster recovery preparation operations; and data compression and deduplication associated with disaster recovery preparation operations.
25. According to some embodiments, a system comprises a memory that stores instructions, and one or more processors that are coupled to the memory and, when executing the instructions, is configured to: determine whether a disaster recovery preparation system has not met a recovery point objective; and in response to determining that the recovery point objective is not met: determine a state of a storage system; apply a machine learning model to determine a change to one or more of a plurality of adjustable parameters of the disaster recovery preparation system based on the state of the storage system and the recovery point objective that is not met; adjust the one or more of the plurality of adjustable parameters based on the determined change to the one or more parameters; after adjusting the one or more parameters, monitor one or more metrics of the disaster recovery preparation system or the storage system; and update the machine learning model based on the monitoring, wherein the plurality of adjustable parameters comprise at least two of: a time window when disaster recovery preparation operations are performed; a bandwidth allocated to the disaster recovery preparation system; a priority assigned to the disaster recovery preparation system; or a number of snapshots that can be concurrently performed and replicated by the disaster recovery preparation system.
26. The system according to clause 25, wherein the disaster recovery preparation system performs snapshot and replication operations for the storage system.
27. The system according to clauses 25-26, wherein the state of the storage system comprises one or more parameters selected from a group consisting of: time of last backup; data integrity status; replication status; data synchronization status; volume and file system information; application availability; hardware health and status; network connectivity status; error and event logs, snapshot status; retention policy compliance; alerts and notifications; configuration details; and historical statistics.

28. The system according to clauses 25-27, wherein each of the one or more metrics are selected from a group consisting of: memory usage of the disaster recovery preparation system; availability of storage in the storage system; a number of outstanding replications; network congestion; an amount of time to complete snapshot and replication operations on the storage system; a number of alerts generated by the disaster recovery preparation system; average latency of the snapshot and replication operations per an amount of data replicated; an amount of data replicated per time unit; input/output operations (IOPS) rate of the storage system; a CPU utilization of the storage system; and a network bandwidth of the storage system.
29. The system according to clauses 25-28, wherein the machine learning model is a reinforcement learning model with multiple agents.
30. The system according to clauses 25-29, wherein the instructions are further configured to reward or penalize each of the multiple agents according to a respective reward function that combines the one or more metrics.
31. The system according to clauses 25-30, wherein at least one of the multiple agents is exclusively trained using a disaster recovery preparation system associated with a particular client.
32. The system according to clauses 25-31, wherein at least one of the multiple agents is trained using a plurality of disaster recovery preparation systems associated with a respective plurality of clients.
33. The system according to clauses 25-32, wherein each of the multiple agents is trained to provide a recommendation to tune the one or more parameters, and wherein any conflicts between recommendations provided by different agents are resolved using a respective weighting function
34. The system according to clauses 25-33, wherein each of the multiple agents is trained to provide a recommendation to tune the one or more parameters, and wherein any conflicts between recommendations provided by different agents are resolved using a respective function employing fuzzy logic principles.
35. The system according to clauses 25-34, wherein each of the multiple agents is trained to tune a different one of the at least two adjustable parameters.
36. The system according to clauses 25-35, where the plurality of adjustable parameters of the disaster recovery preparation system further comprises one or more parameters selected from a group consisting of: local memory usage allocated to the disaster recovery preparation operations; processing power allocated to the disaster recovery preparation operations; backup frequency associated with disaster recovery preparation operations; and data compression and deduplication associated with disaster recovery preparation operations.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable media storing program instructions that, when executed by one or more processors, cause the one or more processors to perform a method for tuning a disaster recovery preparation system for a storage system comprising:

receiving a trigger associated with a recovery point objective that is not met and a state of the storage system;

inputting one or more of the trigger and the state into a machine learning agent comprising a machine learning model, wherein the machine learning agent outputs an action based on the state of the storage system and the recovery point objective that is not met, wherein the machine learning agent comprises an action space that includes at least two actions of:

adjusting a time window when disaster recovery preparation operations are performed;

changing a bandwidth allocated to the disaster recovery preparation system;

updating a priority assigned to the disaster recovery preparation system; or changing a number of snapshots that can be concurrently performed and replicated by the disaster recovery preparation system, and the action includes at least one of the at least two actions;

performing, in the disaster recovery preparation system, the action to change the state of the storage system;

after performing the action, monitoring one or more metrics of the disaster recovery preparation system or the storage system; and training the machine learning model based on the monitoring by tuning one or more parameters of the machine learning model based on the one or more metrics.

2. The one or more non-transitory computer readable media of claim 1, wherein the disaster recovery preparation system performs snapshot and replication operations for the storage system.

3. The one or more non-transitory computer readable media of claim 1, wherein the state of the storage system comprises one or more parameters selected from a group consisting of:

time of last backup;
data integrity status;
replication status;
data synchronization status;
volume and file system information;
application availability;
hardware health and status;
network connectivity status;
error and event logs;
snapshot status;
retention policy compliance;
alerts and notifications;
configuration details; and
historical statistics.

4. The one or more non-transitory computer readable media of claim 1, wherein each of the one or more metrics are selected from a group consisting of:

memory usage of the disaster recovery preparation system;
availability of storage in the storage system;
a number of outstanding replications;
network congestion;
an amount of time to complete snapshot and replication operations on the storage system;
a number of alerts generated by the disaster recovery preparation system;
average latency of the snapshot and replication operations per an amount of data replicated;
an amount of data replicated per time unit;
input/output operations (IOPS) rate of the storage system;
a CPU utilization of the storage system; and
a network bandwidth of the storage system.

5. The one or more non-transitory computer readable media of claim 1, wherein the machine learning model is a reinforcement learning model with multiple agents.

6. The one or more non-transitory computer readable media of claim 5, further comprising rewarding or penalizing each of the multiple agents according to a respective reward function that combines the one or more metrics.

7. The one or more non-transitory computer readable media of claim 5, wherein at least one of the multiple agents is exclusively trained using a disaster recovery preparation system associated with a particular client.

8. The one or more non-transitory computer readable media of claim 5, wherein at least one of the multiple agents is trained using a plurality of disaster recovery preparation systems associated with a respective plurality of clients.

9. The one or more non-transitory computer readable media of claim 5, wherein each of the multiple agents is trained to recommend a respective action, and wherein any conflicts between recommendations provided by different agents are resolved using a respective weighting function.

10. The one or more non-transitory computer readable media of claim 5, wherein each of the multiple agents is trained to recommend a respective action, and wherein any conflicts between recommendations provided by different agents are resolved using a respective function employing fuzzy logic principles.

11. The one or more non-transitory computer readable media of claim 5, wherein each of the multiple agents is trained to tune a different action in the action space.

12. The one or more non-transitory computer readable media of claim 1, where the action space further comprises one or more actions selected from a group consisting of:

allocating a local memory usage to the disaster recovery preparation operations;
allocating a processing power to the disaster recovery preparation operations;
updating a backup frequency associated with disaster recovery preparation operations; and
modifying data compression and deduplication associated with disaster recovery preparation operations.

13. A computer-implemented method for tuning a disaster recovery preparation system for a storage system comprising:

receiving a trigger associated with a recovery point objective that is not met and a state of the storage system;

inputting one or more of the trigger or the state into a machine learning agent comprising a machine learning model, wherein the machine learning agent outputs an action based on the state of the storage system and the recovery point objective that is not met, wherein the machine learning agent comprises an action space that includes at least two actions of:

adjusting a time window when disaster recovery preparation operations are performed;

changing a bandwidth allocated to the disaster recovery preparation system;

updating a priority assigned to the disaster recovery preparation system; or changing a number of snapshots that can be concurrently performed and replicated by the disaster recovery preparation system, and the action includes at least one of the at least two actions;

performing, in the disaster recovery preparation system, the action to change the state of the storage system;

after performing the action, monitoring one or more metrics of the disaster recovery preparation system or the storage system; and training the machine learning model based on the monitoring by tuning one or more parameters of the machine learning model based on the one or more metrics.

14. The method of claim 13, wherein the disaster recovery preparation system performs snapshot and replication operations for the storage system.

15. The method of claim 13, wherein the state of the storage system comprises one or more parameters selected from a group consisting of:

time of last backup;
data integrity status;
replication status;
data synchronization status;
volume and file system information;
application availability;
hardware health and status;
network connectivity status;
error and event logs;
snapshot status;
retention policy compliance;
alerts and notifications;
configuration details; and
historical statistics.

16. The method of claim 13, wherein each of the one or more metrics are selected from a group consisting of:

memory usage of the disaster recovery preparation system;
availability of storage in the storage system;
a number of outstanding replications;
network congestion;
an amount of time to complete snapshot and replication operations on the storage system;
a number of alerts generated by the disaster recovery preparation system;
average latency of the snapshot and replication operations per an amount of data replicated;
an amount of data replicated per time unit;
input/output operations (IOPS) rate of the storage system;
a CPU utilization of the storage system; and
a network bandwidth of the storage system.

17. The method of claim 13, wherein the machine learning model is a reinforcement learning model with multiple agents.

18. The method of claim 17, further comprising rewarding or penalizing each of the multiple agents according to a respective reward function that combines the one or more metrics.

19. The method of claim 17, wherein at least one of the multiple agents is exclusively trained using a disaster recovery preparation system associated with a particular client.

20. The method of claim 17, wherein at least one of the multiple agents is trained using a plurality of disaster recovery preparation systems associated with a respective plurality of clients.

21. The method of claim 17, wherein each of the multiple agents is trained to recommend a respective action, and wherein any conflicts between recommendations provided by different agents are resolved using a respective weighting function.

22. The method of claim 17, wherein each of the multiple agents is trained to recommend a respective action, and wherein any conflicts between recommendations provided by different agents are resolved using a respective function employing fuzzy logic principles.

23. The method of claim 17, wherein each of the multiple agents is trained to tune a different action in the action space.

24. The method of claim 13, where the action space further comprises one or more actions selected from a group consisting of:

allocating a local memory usage to the disaster recovery preparation operations;

allocating a processing power to the disaster recovery preparation operations;

updating a backup frequency associated with disaster recovery preparation operations; and modifying data compression and deduplication associated with disaster recovery preparation operations.

25. A system comprising: a memory that stores instructions, and one or more processors that are coupled to the memory and, when executing the instructions, is configured to:

receive a trigger associated with a recovery point objective of a disaster recovery preparation system that is not met:

determine a state of a storage system;

input one or more of the trigger and the state into a machine learning agent comprising a machine learning model, wherein the machine learning agent outputs an action based on the state of the storage system and the recovery point objective that is not met, wherein the action is selected from machine learning agent comprises an action space of the machine learning agent that includes at least two actions of:

adjusting a time window when disaster recovery preparation operations are performed;

changing a bandwidth allocated to the disaster recovery preparation system;

updating a priority assigned to the disaster recovery preparation system; or changing a number of snapshots that can be concurrently performed and replicated by the disaster recovery preparation system, and the action includes at least one of the at least two actions;

perform, in the disaster recovery preparation system, the action to change the state of the storage system;

after performing the action, monitor one or more metrics of the disaster recovery preparation system or the storage system; and train the machine learning model based on the monitoring by tuning one or more parameters of the machine learning model based on the one or more metrics.

26. The system of claim 25, wherein the disaster recovery preparation system performs snapshot and replication operations for the storage system.

27. The system of claim 25, wherein the state of the storage system comprises one or more parameters selected from a group consisting of:

time of last backup;
data integrity status;
replication status;
data synchronization status;
volume and file system information;
application availability;
hardware health and status;
network connectivity status;
error and event logs;
snapshot status;
retention policy compliance;
alerts and notifications;
configuration details; and
historical statistics.

28. The system of claim 25, wherein each of the one or more metrics are selected from a group consisting of:

memory usage of the disaster recovery preparation system;
availability of storage in the storage system;
a number of outstanding replications;
network congestion;
an amount of time to complete snapshot and replication operations on the storage system;
a number of alerts generated by the disaster recovery preparation system;
average latency of the snapshot and replication operations per an amount of data replicated;
an amount of data replicated per time unit;
input/output operations (IOPS) rate of the storage system;
a CPU utilization of the storage system; and
a network bandwidth of the storage system.

29. The system of claim 25, wherein the machine learning model is a reinforcement learning model with multiple agents.

30. The system of claim 29, wherein the instructions are further configured to reward or penalize each of the multiple agents according to a respective reward function that combines the one or more metrics.

31. The system of claim 29, wherein at least one of the multiple agents is exclusively trained using a disaster recovery preparation system associated with a particular client.

32. The system of claim 29, wherein at least one of the multiple agents is trained using a plurality of disaster recovery preparation systems associated with a respective plurality of clients.

33. The system of claim 29, wherein each of the multiple agents is trained to recommend a respective action, and wherein any conflicts between recommendations provided by different agents are resolved using a respective weighting function.

34. The system of claim 29, wherein each of the multiple agents is trained to recommend a respective action, and wherein any conflicts between recommendations provided by different agents are resolved using a respective function employing fuzzy logic principles.

35. The system of claim 29, wherein each of the multiple agents is trained to tune a different action in the action space.

36. The system of claim 25, where the action space further comprises one or more actions selected from a group consisting of:

allocating a local memory usage to the disaster recovery preparation operations;
allocating a processing power to the disaster recovery preparation operations;
updating a backup frequency associated with disaster recovery preparation operations; and
modifying data compression and deduplication associated with disaster recovery preparation operations.

* * * * *